(12) United States Patent
Zong et al.

(10) Patent No.: US 11,558,346 B2
(45) Date of Patent: Jan. 17, 2023

(54) ADDRESS MANAGEMENT METHOD AND SYSTEM, AND DEVICE

(71) Applicant: Huawei Technologies Co., Ltd., Shenzhen (CN)

(72) Inventors: Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/944,942

(22) Filed: Jul. 31, 2020

(65) Prior Publication Data

US 2020/0366642 A1 Nov. 19, 2020

Related U.S. Application Data

(63) Continuation of application No. PCT/CN2019/072174, filed on Jan. 17, 2019.

(30) Foreign Application Priority Data

Feb. 7, 2018 (CN) .......................... 201810124017.6
Sep. 21, 2018 (CN) ........................... 201811110305.2

(51) Int. Cl.
*H04L 61/5046* (2022.01)
*H04L 61/251* (2022.01)
(Continued)

(52) U.S. Cl.
CPC ........ *H04L 61/5046* (2022.05); *H04L 61/251* (2013.01); *H04L 61/5014* (2022.05); *H04L 61/5061* (2022.05); *H04L 67/14* (2013.01)

(58) Field of Classification Search
CPC . H04L 61/2046; H04L 61/2007; H04L 61/20; H04L 41/08; H04L 61/2535;
(Continued)

(56) References Cited

U.S. PATENT DOCUMENTS 6,587,468 B1 * 7/2003 Dos Santos ......... H04L 29/1282
370/401
7,197,549 B1 * 3/2007 Salama ............. H04L 29/12283
709/223
(Continued)

FOREIGN PATENT DOCUMENTS

CN 102647486 A 8/2012
CN 107318158 A 11/2017
(Continued)

OTHER PUBLICATIONS

3GPP TR 23.726 V16.0.0, "3rd Generation Partnership Project; Technical Specification Group Services and System Aspects; Study on Enhancing Topology of SMF and UPF in 5G Networks (Release 16)," Dec. 2018, 96 pages.
(Continued)

*Primary Examiner* — Dhairya A Patel
*Assistant Examiner* — Vinh Nguyen
(74) *Attorney, Agent, or Firm* — Conley Rose, P.C.

(57) ABSTRACT

An address management method, system, and device to avoid a problem that a same Internet Protocol (IP) address is assigned to different packet data unit (PDU) sessions and to effectively use IP addresses in an address pool. The method includes: obtaining, by a session management network element, an identifier of a user plane function network element serving a terminal and session information of the terminal; determining, by the session management network element based on the identifier of the user plane function network element and the session information, an address pool identifier corresponding to the session; sending, by the session management network element, the address pool identifier to a server, where the address pool identifier is used to assign an IP address to the session; and receiving, by
(Continued)

the session management network element from the server, the IP address corresponding to the session.

23 Claims, 8 Drawing Sheets

(51) Int. Cl.
  *H04L 67/14* (2022.01)
  *H04L 61/5014* (2022.01)
  *H04L 61/5061* (2022.01)
(58) Field of Classification Search
  CPC ............ H04L 61/2015; H04L 61/2092; H04L 61/2084; H04L 61/2061; H04L 61/251; H04L 67/14; H04L 61/2076; H04L 67/141; H04W 80/04; H04W 8/26
  See application file for complete search history.

(56) References Cited

U.S. PATENT DOCUMENTS

| | | | | |
|---|---|---|---|---|
| 8,850,067 | B2* | 9/2014 | Ait-Ameur | H04L 61/503 709/224 |
| 9,161,211 | B2* | 10/2015 | Faccin | H04W 8/26 |
| 10,069,791 | B2* | 9/2018 | Bhaskaran | H04W 76/22 |
| 2003/0101243 | A1* | 5/2003 | Donahue | H04L 41/0843 709/220 |
| 2005/0097223 | A1* | 5/2005 | Shen | H04L 61/2061 709/245 |
| 2005/0163118 | A1* | 7/2005 | Steindl | H04L 61/2015 370/389 |
| 2007/0104205 | A1* | 5/2007 | Baik | H04L 61/1535 370/395.3 |
| 2011/0075675 | A1* | 3/2011 | Koodli | H04M 15/41 370/401 |
| 2012/0042058 | A1* | 2/2012 | Shaikh | H04L 61/203 709/222 |
| 2013/0166776 | A1* | 6/2013 | Gao | H04L 61/2514 709/245 |
| 2014/0006568 | A1* | 1/2014 | Subramanian | H04L 61/2015 709/220 |
| 2015/0063161 | A1* | 3/2015 | Homma | H04W 24/02 370/254 |
| 2017/0019874 | A1 | 1/2017 | Liao et al. | |
| 2017/0118275 | A1* | 4/2017 | Singh | H04L 61/2007 |
| 2018/0115891 | A1* | 4/2018 | Kim | H04L 61/1588 |
| 2018/0192471 | A1* | 7/2018 | Li | H04W 4/60 |
| 2018/0227267 | A1* | 8/2018 | Joul | H04W 4/24 |
| 2018/0227743 | A1* | 8/2018 | Faccin | H04W 76/10 |
| 2019/0053117 | A1* | 2/2019 | Bae | H04W 76/30 |
| 2019/0075606 | A1* | 3/2019 | Myhre | H04L 45/64 |
| 2019/0090164 | A1 | 3/2019 | Ding et al. | |
| 2019/0182875 | A1* | 6/2019 | Talebi Fard | H04W 8/18 |
| 2020/0059989 | A1* | 2/2020 | Velev | H04W 76/30 |
| 2020/0120589 | A1* | 4/2020 | Velev | H04W 76/25 |
| 2020/0383151 | A1* | 12/2020 | Wang | H04W 36/00 |

FOREIGN PATENT DOCUMENTS

| | | |
|---|---|---|
| CN | 108462735 A | 8/2018 |
| EP | 2843910 B1 | 9/2017 |

OTHER PUBLICATIONS

S2-170947, T-Mobile USA Inc, "IP Index for IP Address Allocation based on PCF," SA WG2 Meeting #119, Feb. 13-17, 2017, Dubrovnik, Croatia, 4 pages.
S2-180061, Nokia, et al., "FS_ETSUN / 23.726 Key Issue: enhance the capabilities for a UPF to be controlled by multiple SMF's," A WG2 Meeting #125, Jan. 22-26, 2018, Gothenburg, Sweden, 2 pages.
S2-182477, Huawei, et al., "Solution: IP address allocation," SA WG2 Meeting #126, Feb. 26-Mar. 2, 2018, Montreal, Canada, 5 pages.
S2-184095, Ericsson, "Updates to solution 11," SA WG2 Meeting #127, Apr. 16-20, 2018, Sanya, China, 3 pages.
S2-187995, Ericsson, "Evaluation of solution #12 on IP address allocation," SA WG2 Meeting #128-BIS, Aug. 20-25, 2018, Sophia Antipolis, France, 3 pages.
S2-1900451, Huawei, "IP Address allocation," 3GPP TSG-SA WG2 Meeting #130 ,Jan. 21-25, 2019, Kochi, India, 2 pages.
3GPP TS 23.501 V15.0.0, "3rd Generation Partnership Project; Technical Specification Group Services and System Aspects; System Architecture for the 5G System; Stage 2 (Release 15)," Dec. 2017, 181 pages.
3GPP TS 23.502 V15.0.0, "3rd Generation Partnership Project; Technical Specification Group Services and System Aspects; Procedures for the 5G System; Stage 2 (Release 15)," Dec. 2017, 257 pages.
3GPP TS 29.561 V0.3.0, "3rd Generation Partnership Project; Technical Specification Group Core Network and Terminals; 5G System; Interworking between 5G Network and external Data Networks; Stage 3 (Release 15)," Jan. 2018, 34 pages.
Droms, R., "Dynamic Host Configuration Protocol" RFC 2131, Network Working Group, Mar. 1997, 45 pages.
S2-182222, Huawei, et al., "Solution: IP address allocation," SA WG2 Meeting #126, Feb. 26-Mar. 2, 2018, Montreal, Canada, 4 pages.
S2-187955, Huawei, et al., "Solution for KI#3: IP address preservation for session continuity," 3GPP TSG-SA WG2 Meeting #128bis, Sophia Antipolis, France, Aug. 20-24, 2018, 3 pages.

* cited by examiner

ADDRESS MANAGEMENT METHOD AND SYSTEM, AND DEVICE

CROSS-REFERENCE TO RELATED APPLICATIONS

This application is a continuation of International Patent Application No. PCT/CN2019/072174, filed on Jan. 17, 2019, which claims priorities to Chinese Patent Application No. 201810124017.6, filed on Feb. 7, 2018, and Chinese Patent Application No. 201811110305.2, filed on Sep. 21, 2018. The disclosures of the aforementioned applications are hereby incorporated by reference in their entireties.

TECHNICAL FIELD

This application relates to the field of communications technologies, and in particular, to an address management method and system, and a device.

BACKGROUND

In an existing fifth generation (5G) network architecture, one session management function (SMF) network element can control a plurality of user plane function (UPF) network elements, and one UPF network element can be controlled by a plurality of SMF network elements.

In a scenario in which one UPF network element is controlled by a plurality of SMF network elements, to send downlink data that belongs to different packet data unit (PDU) sessions in one data network (DN) to a terminal through respective tunnels corresponding to the PDU sessions, different Internet Protocol (IP) addresses need to be assigned to the different PDU sessions. Otherwise, the UPF network element cannot determine a tunnel that corresponds to a PDU session and through which downlink data whose destination addresses are a same IP address is to be sent to the terminal.

To resolve the foregoing problem, in other approaches, an address management method is provided to partition an IP address pool corresponding to a data network managed by a UPF network element. For example, if one UPF network element is connected to three SMF network elements, an IP address pool corresponding to a data network managed by the UPF network element may be partitioned into three different segments. The three different segments are configured on the three different SMF network elements respectively. In this case, because different IP address segments are configured on the different SMF network elements, IP addresses that are assigned by the different SMF network elements and managed by the UPF network element are not the same.

Although the foregoing method can avoid a problem that a same IP address is assigned to different PDU sessions, IP addresses may not be effectively used if there are a relatively large quantity of SMF network elements or there are a limited quantity of IP addresses in an IP address pool corresponding to a data network managed by a UPF network element. For example, all IP address in an IP address segment configured on an SMF 1 network element are not available, but an IP address in an IP address segment configured on another SMF network element is still available. In this case, if the SMF network element 1 is selected to serve a PDU session, even though an IP address corresponding to a data network managed by a UPF network element is available, the terminal still cannot access the data network.

Therefore, when one UPF network element is controlled by a plurality of SMF network elements, how to manage addresses to avoid a problem that a same IP address is assigned to different PDU sessions and to effectively use IP addresses in an address pool is an urgent problem to be resolved currently.

SUMMARY

Embodiments of this application provide an address management method, system, and device, to avoid a problem that a same IP address is assigned to different PDU sessions and to effectively use IP addresses in an address pool.

To achieve the foregoing objectives, the following technical solutions are used in the embodiments of this application.

According to a first aspect, an address management method is provided, where the method includes: obtaining, by a session management network element, an identifier of a user plane function network element serving a terminal and session information of the terminal; determining, by the session management network element based on the identifier of the user plane function network element and the session information, an address pool identifier corresponding to the session; sending, by the session management network element, the address pool identifier to a server, where the address pool identifier is used to assign an Internet Protocol (IP) address to the session; and receiving, by the session management network element from the server, the IP address corresponding to the session. A difference from other approaches in which an address pool is partitioned into IP address segments and the IP address segments are configured on different session management network elements lies in that, in the address management method provided in this embodiment, the session management network element sends the address pool identifier to the server, where the address pool identifier is used to assign the IP address to the session. In other words, IP addresses in an address pool are managed together by the server. Therefore, a problem that a same IP address is assigned to different PDU sessions can be avoided, and the IP addresses in the address pool can be effectively used.

In a possible design, the method further includes: obtaining, by the session management network element, an address pool identifier corresponding to the identifier of the user plane function network element and the session information; and determining, by the session management network element based on the identifier of the user plane function network element serving the terminal and the session information, an address pool identifier corresponding to the session by determining, by the session management network element, the address pool identifier corresponding to the identifier of the user plane function network element and the session information as the address pool identifier corresponding to the session. Based on this solution, the session management network element may determine the address pool identifier corresponding to the session.

In a possible design, the server includes a network repository function network element or a Dynamic Host Configuration Protocol (DHCP) server. Additionally, sending, by the session management network element, the address pool identifier to a server includes sending, by the session management network element, a request message to the server, where the request message carries the address pool identifier. Receiving, by the session management network element from the server, the IP address corresponding to the session includes: receiving, by the session management network element, a response message from the server, where the response message carries the IP address corresponding to the session.

In a possible design, the server includes the DHCP server. Additionally, when the address pool identifier is an IP address, the address pool identifier is carried in a gateway IP address (GIADDR) field of the request message. Alternatively, when the address pool identifier is not an IP address, the address pool identifier is carried in an extended DHCP relay agent information option of the request message. That is, this solution provides an address pool identifier carrying manner.

In a possible design, the server includes the network repository function network element or the DHCP server, and the method further includes: sending, by the session management network element to the server, an interface type of a tunnel corresponding to the session, where the interface type is used to allocate corresponding tunnel information to the session; and receiving, by the session management network element from the server, the tunnel information corresponding to the session. Based on this solution, the server may centrally allocate tunnel information. Therefore, a problem that same tunnel information is allocated to different PDU sessions can be avoided.

Optionally, the session information in this embodiment of this application includes at least one of an address pool selection policy, a data network name (DNN), or an IP address version.

Optionally, the address pool identifier in this embodiment of this application includes at least one of a DNN, a start address of an address pool, an IP address version, or the identifier of the user plane function network element.

According to a second aspect, an address management method is provided, where the method includes: obtaining, by a network repository function network element, an identifier of a user plane function network element serving a terminal and session information of the terminal; assigning, by the network repository function network element, an IP address to the session based on the identifier of the user plane function network element and the session information; and sending, by the network repository function network element to the session management network element, the IP address corresponding to the session. A difference from other approaches in which an address pool is partitioned into IP address segments and the IP address segments are configured on different session management network elements lies in that, in the address management method provided in this embodiment, the network repository function network element may assign the IP address to the session based on the identifier of the user plane function network element and the session information, and then send, to the session management network element, the IP address corresponding to the session. In other words, IP addresses in an address pool are managed together by the network repository function network element. Therefore, a problem that a same IP address is assigned to different PDU sessions can be avoided, and the IP addresses in the address pool can be effectively used.

In a possible design, assigning, by the network repository function network element, an IP address to the session based on the identifier of the user plane function network element and the session information includes: determining, by the network repository function network element based on the identifier of the user plane function network element and the session information, an address pool corresponding to the session; and assigning, by the network repository function network element to the session, the IP address in the address pool corresponding to the session. Based on this solution, the network repository function network element may assign the corresponding IP address to the session.

In a possible design, the method further includes obtaining, by the network repository function network element, an address pool corresponding to the identifier of the user plane function network element and the session information. Additionally, determining, by the network repository function network element based on the identifier of the user plane function network element and the session information, an address pool corresponding to the session includes determining, by the network repository function network element, the address pool corresponding to the identifier of the user plane function network element and the session information as the address pool corresponding to the session. Based on this solution, the network repository function network element may determine the address pool corresponding to the session, and assign the corresponding IP address to the session based on the address pool.

In a possible design, obtaining, by a network repository function network element, session information of the terminal includes receiving, by the network repository function network element, the session information of the terminal from the session management network element. Based on this solution, the network repository function network element may obtain the session information of the terminal.

In a possible design, obtaining, by a network repository function network element, an identifier of a user plane function network element serving a terminal includes: receiving, by the network repository function network element, the identifier of the user plane function network element from the session management network element; or determining, by the network repository function network element, the identifier of the user plane function network element. Based on this solution, the network repository function network element may obtain the identifier of the user plane function network element serving the terminal.

In a possible design, the method further includes: receiving, by the network repository function network element from the session management network element, an interface type of a tunnel corresponding to the session; allocating, by the network repository function network element, corresponding tunnel information to the session based on the identifier of the user plane function network element and the interface type; and sending, by the network repository function network element to the session management network element, the tunnel information corresponding to the session. Based on this solution, the network repository function network element may centrally allocate tunnel information. Therefore, a problem that same tunnel information is allocated to different PDU sessions can be avoided.

In a possible design, allocating, by the network repository function network element, corresponding tunnel information to the session based on the identifier of the user plane function network element and the interface type includes selecting, by the network repository function network element for the session from interface tunnel information of the user plane function network element corresponding to the identifier of the user plane function network element, a tunnel identifier and a tunnel IP address that correspond to the interface type. Based on this solution, the network repository function network element may allocate the corresponding tunnel information to the session.

According to a third aspect, a session management network element is provided, where the session management network element has a function of implementing the method according to any design of the first aspect or the following twenty-fourth aspect. The function may be implemented by hardware, or may be implemented by hardware executing corresponding software. The hardware or the software includes one or more modules corresponding to the foregoing function.

According to a fourth aspect, a session management network element is provided, including a processor and a memory. The memory is configured to store a computer-executable instruction, and when the session management network element runs, the processor executes the computer-executable instruction stored in the memory, to enable the session management network element to perform the address management method according to any design of the first aspect or the following twenty-fourth aspect.

According to a fifth aspect, a session management network element is provided, including a processor. The processor is configured such that after being coupled to a memory and reading an instruction from the memory, the processor performs, according to the instruction, the address management method according to any design of the first aspect or the following twenty-fourth aspect.

According to a sixth aspect, a computer-readable storage medium is provided, where the computer-readable storage medium stores an instruction. When the instruction is run on a computer, the computer is enabled to perform the address management method according to any design of the first aspect or the following twenty-fourth aspect.

According to a seventh aspect, a computer program product including an instruction is provided, where when the computer program product runs on a computer. The computer is enabled to perform the address management method according to any design of the first aspect or the following twenty-fourth aspect.

According to an eighth aspect, a chip system is provided, where the chip system includes a processor configured to support a session management network element in implementing functions in the first aspect or the following twenty-fourth aspect, for example, obtaining an identifier of a user plane function network element serving a terminal and session information of the terminal. In a possible design, the chip system further includes a memory, where the memory is configured to store a program instruction and data that are necessary for the session management network element. The chip system may include a chip, or may include a chip and another discrete component.

For a technical effect brought by any design of the third aspect to the eighth aspect, refer to technical effects brought by different designs of the first aspect or the following twenty-fourth aspect. Details are not described herein.

According to a ninth aspect, a network repository function network element is provided, where the network repository function network element has a function of implementing the method according to any design of the second aspect. The function may be implemented by hardware, or may be implemented by hardware executing corresponding software. The hardware or the software includes one or more modules corresponding to the foregoing function.

According to a tenth aspect, a network repository function network element is provided, including a processor and a memory, where the memory is configured to store a computer-executable instruction. When the network repository function network element runs, the processor executes the computer-executable instruction stored in the memory, to enable the network repository function network element to perform the address management method according to any design of the second aspect.

According to an eleventh aspect, a network repository function network element is provided, including a processor. The processor is configured such that after being coupled to a memory and reading an instruction from the memory, the processor performs, according to the instruction, the address management method according to any design of the second aspect.

According to a twelfth aspect, a computer-readable storage medium is provided, where the computer-readable storage medium stores an instruction. When the instruction is run on a computer, the computer is enabled to perform the address management method according to any design of the second aspect.

According to a thirteenth aspect, a computer program product including an instruction is provided. When the computer program product runs on a computer, the computer is enabled to perform the address management method according to any design of the second aspect.

According to a fourteenth aspect, a chip system is provided, where the chip system includes a processor configured to support a network repository function network element in implementing functions in the second aspect, for example, assigning an IP address to a session based on an identifier of a user plane function network element and session information. In a possible design, the chip system further includes a memory, where the memory is configured to store a program instruction and data that are necessary for the network repository function network element. The chip system may include a chip, or may include a chip and another discrete component.

For a technical effect brought by any design of the ninth aspect to the fourteenth aspect, refer to the technical effects brought by the different designs of the second aspect. Details are not described herein.

According to a fifteenth aspect, an address management system is provided, where the address management system includes a session management network element and a server. The session management network element is configured to: obtain an identifier of a user plane function network element serving a terminal and session information of the terminal; determine, based on the identifier of the user plane function network element and the session information, an address pool identifier corresponding to the session; and send the address pool identifier to the server. The server is configured to: receive the address pool identifier from the session management network element; assign an IP address to the session based on the address pool identifier; and send, to the session management network element, the IP address corresponding to the session. The session management network element is further configured to receive, from the server, the IP address corresponding to the session.

In a possible design, the server is further configured to obtain an address pool corresponding to the address pool identifier. Additionally, the server is configured to assign an IP address to the session based on the address pool identifier by: determining the address pool corresponding to the address pool identifier as an address pool corresponding to the session; and assigning, to the session, the IP address in the address pool corresponding to the session.

In a possible design, the session management network element is further configured to send, to the server, an interface type of a tunnel corresponding to the session. The server is further configured to: receive the interface type from the session management network element; allocate corresponding tunnel information to the session based on the identifier of the user plane function network element and the interface type; and send, to the session management network element, the tunnel information corresponding to the session. The session management network element is further configured to receive, from the server, the tunnel information corresponding to the session.

In a possible design, the server includes a network repository function network element or a DHCP server.

For a technical effect brought by any design of the fifteenth aspect, refer to the technical effects brought by the different designs of the first aspect. Details are not described herein.

According to a sixteenth aspect, an address management system is provided, where the address management system includes a network repository function network element and a session management network element. The network repository function network element is configured to: obtain an identifier of a user plane function network element serving a terminal and session information of the terminal; assign an IP address to the session based on the identifier of the user plane function network element and the session information; and send, to the session management network element, the IP address corresponding to the session. The session management network element is configured to receive, from the network repository function network element, the IP address corresponding to the session.

For a technical effect brought by the sixteenth aspect, refer to the technical effects brought by the different designs of the second aspect. Details are not described herein.

According to a seventeenth aspect, a session management method is provided, where the method further includes: obtaining, by a server, an identifier of a user plane function network element serving a terminal and an interface type of a tunnel corresponding to a session of the terminal; allocating, by the server, corresponding tunnel information to the session based on the identifier of the user plane function network element and the interface type; and sending, by the server to the session management network element, the tunnel information corresponding to the session. Based on this solution, the server may centrally allocate tunnel information. Therefore, a problem that same tunnel information is allocated to different PDU sessions can be avoided.

In a possible design, allocating, by the server, corresponding tunnel information to the session based on the identifier of the user plane function network element and the interface type includes selecting, by the server for the session from interface tunnel information of the user plane function network element corresponding to the identifier of the user plane function network element, a tunnel identifier and a tunnel IP address that correspond to the interface type. Based on this solution, the server may allocate the corresponding tunnel information to the session.

Optionally, the server in this embodiment includes a network repository function network element or a DHCP server.

According to an eighteenth aspect, a server is provided, where the server has a function of implementing the method according to any design of the seventeenth aspect. The function may be implemented by hardware, or may be implemented by hardware executing corresponding software. The hardware or the software includes one or more modules corresponding to the foregoing function.

According to a nineteenth aspect, a server is provided, including a processor and a memory, where the memory is configured to store a computer-executable instruction. When the server runs, the processor executes the computer-executable instruction stored in the memory, to enable the server to perform the address management method according to any design of the seventeenth aspect.

According to a twentieth aspect, a server is provided, including a processor. The processor is configured such that after being coupled to a memory and reading an instruction from the memory, the processor performs, according to the instruction, the session management method according to any design of the seventeenth aspect.

According to a twenty-first aspect, a computer-readable storage medium is provided, where the computer-readable storage medium stores an instruction. When the instruction is run on a computer, the computer is enabled to perform the session management method according to any design of the seventeenth aspect.

According to a twenty-second aspect, a computer program product including an instruction is provided. When the computer program product runs on a computer, the computer is enabled to perform the session management method according to any design of the seventeenth aspect.

According to a twenty-third aspect, a chip system is provided, where the chip system includes a processor, configured to support a server in implementing functions in the seventeenth aspect, for example, allocating corresponding tunnel information to a session based on the identifier of the user plane function network element and the interface type. In a possible design, the chip system further includes a memory, where the memory is configured to store a program instruction and data that are necessary for the server. The chip system may include a chip, or may include a chip and another discrete component.

For a technical effect brought by any design of the eighteenth aspect to the twenty-third aspect, refer to the technical effects brought by the different designs of the seventeenth aspect. Details are not described herein.

According to a twenty-fourth aspect, an address management method is provided, where the method includes: obtaining, by a session management network element, an identifier of a user plane function network element serving a terminal and session information of the terminal; determining, by the session management network element based on the identifier of the user plane function network element and the session information, an address pool identifier corresponding to the session; sending, by the session management network element, the address pool identifier to a server; receiving, by the session management network element from the server, a start address of a first IP address segment corresponding to the address pool identifier; and assigning, by the session management network element, a first IP address to the session based on the start address of the first IP address segment. A difference from other approaches in which an address pool is partitioned into IP address segments and the IP address segments are configured on different session management network elements lies in that, in the address management method provided in this embodiment, the session management network element may send the address pool identifier to the server. The server may determine the start address of the first IP address segment corresponding to the address pool identifier, and then send the start address of the first IP address segment to the session management network element. The session management network element may assign the first IP address to the session based on the start address of the first IP address segment. In other words, IP address segments in an address pool are managed together by the server. Therefore, a problem that a same IP address is assigned to different PDU sessions can be avoided, and IP addresses in the address pool can be effectively used. In addition, because a start address of an IP address segment is configured on the server, obtaining an IP address from the server is equivalent to obtaining an IP address segment. In this way, the session management network element does not need to send, when each PDU session is to be established, signaling to the server to assign an IP address. Therefore, signaling exchange between the session management network element and the server due to IP address assignment can be greatly reduced, and system resources can be saved.

In a possible design, assigning, by the session management network element, a first IP address to the session based on the start address of the first IP address segment includes: determining, by the session management network element, the first IP address segment based on the start address of the first IP address segment and a length of the first IP address segment; and assigning, by the session management network element, the first IP address in the first IP address segment to the session.

In a possible design, before sending, by the session management network element, the address pool identifier to a server, the method further includes determining, by the session management network element, that an unassigned IP address corresponding to the address pool identifier does not exist. In other words, in this embodiment of this application, the session management network element may determine that an unassigned IP address corresponding to the address pool identifier does not exist, and then request a corresponding start address of an IP address segment from the server. Therefore, signaling exchange between the session management network element and the server can be reduced, and system resources can be further saved.

In a possible design, determining, by the session management network element, that an unassigned IP address corresponding to the address pool identifier does not exist includes: determining, by the session management network element, that an IP address segment corresponding to the address pool identifier does not exist; or determining, by the session management network element, that a second IP address segment corresponding to the address pool identifier exists, but an unassigned IP address does not exist in the second IP address segment. Based on this solution, the session management network element may determine that an unassigned IP address corresponding to the address pool identifier does not exist.

In a possible design, the method further includes obtaining, by the session management network element, a length or lengths of one or more IP address segments corresponding to the address pool identifier, where the one or more IP address segments include the first IP address segment. Based on this solution, the session management network element may learn the length or lengths of the one or more IP address segments corresponding to the address pool identifier. Then, the session management network element obtains, from the server, the start address of the IP address segment corresponding to the address pool identifier, and determines the corresponding IP address segment based on the start address of the IP address segment and the length of the IP address segment.

In a possible design, obtaining, by the session management network element, a length or lengths of one or more IP address segments corresponding to the address pool identifier includes obtaining, from a network repository function network element, the user plane network element, or an operation administration and maintenance network element, the length or lengths of the one or more IP address segments corresponding to the address pool identifier. Based on this solution, the session management network element may obtain the length or lengths of the one or more IP address segments corresponding to the address pool identifier.

In a possible design, the method further includes: determining, by the session management network element, that all IP addresses in the first IP address segment are released; and sending, by the session management network element, a first message to the server, where the first message includes the start address of the first IP address segment, and is used to release the start address of the first IP address segment. Based on this solution, assignment status information of the start address of the first IP address segment in the server may be updated in time.

With reference to the first aspect and the twenty-fourth aspect, in a possible design, the method further includes: obtaining, by the session management network element, a correspondence between the address pool identifier, and the identifier of the user plane function network element and the session information; and correspondingly, determining, by the session management network element based on the identifier of the user plane function network element and the session information, an address pool identifier corresponding to the session is determining, by the session management network element based on the identifier of the user plane function network element, the session information, and the correspondence, the address pool identifier corresponding to the session. Based on the solution, the session management network element may determine the address pool identifier corresponding to the identifier of the user plane function network element and the session information.

With reference to the first aspect and the twenty-fourth aspect, in a possible design, obtaining, by the session management network element, a correspondence between the address pool identifier, and the identifier of the user plane function network element and the session information includes obtaining, by the session management network element from the user plane network element, the operation administration and maintenance network element, or the network repository function network element, the correspondence between the address pool identifier, and the identifier of the user plane function network element and the session information. Based on this solution, the session management network element may obtain the correspondence between the address pool identifier, and the identifier of the user plane function network element and the session information.

According to a twenty-fifth aspect, an address management system is provided, where the system includes a session management network element and a server.

The session management network element is configured to: obtain an identifier of a user plane function network element serving a terminal and session information of the terminal; and determine, based on the identifier of the user plane function network element and the session information, an address pool identifier corresponding to the session.

The session management network element is further configured to send the address pool identifier to the server.

The server is configured to: receive the address pool identifier from the session management network element; and determine a start address of a first IP address segment corresponding to the address pool identifier.

The server is further configured to send the start address of the first IP address segment to the session management network element.

The session management network element is configured to: receive the start address of the first IP address segment from the server; and assign a first IP address to the session based on the start address of the first IP address segment.

In a possible design, that the session management network element is configured to assign a first IP address to the session based on the start address of the first IP address segment includes: determining, by the session management network element, the first IP address segment based on the start address of the first IP address segment and a length of the first IP address segment; and assigning the first IP address in the first IP address segment to the session.

For a technical effect brought by any design of the twenty-fifth aspect, refer to the technical effects brought by the different designs of the twenty-fourth aspect. Details are not described herein.

These aspects or other aspects in this application are clearer and more intelligible in descriptions in the following embodiments.

DESCRIPTION OF EMBODIMENTS

The following describes the technical solutions in the embodiments of this application with reference to the accompanying drawings in the embodiments of this application. In the descriptions of this application, "/" means "or" unless otherwise specified. For example, A/B may indicate A or B. In this specification, "and/or" describes only an association relationship for describing associated objects and indicates that three relationships may exist. For example, A and/or B may indicate the following three cases: Only A exists, both A and B exist, and only B exists. In addition, in the descriptions of this application, "a plurality of" means two or more than two unless otherwise specified. In addition, to clearly describe the technical solutions in the embodiments of this application, the terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 1:
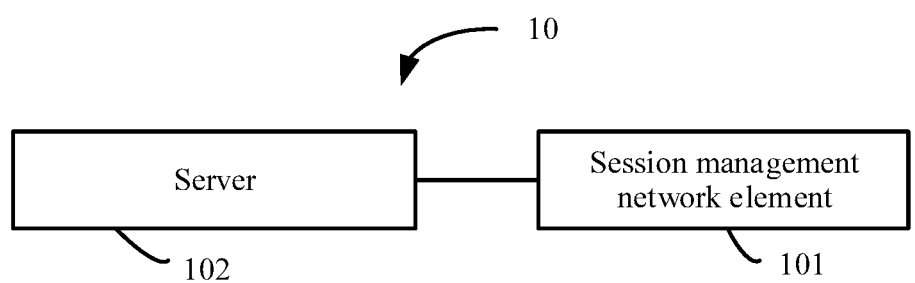
FIG. 1 is a schematic architectural diagram 1 of an address management system according to an embodiment of this application.

FIG. 1 shows an address management system 10 according to an embodiment of this application. The address management system 10 includes a session management network element 101 and a server 102. The session management network element 101 and the server 102 may directly communicate with each other, or may communicate with each other through forwarding by another device. This is not specifically limited in this embodiment of this application.

A possible implementation in the address management system 10 includes the following.

The session management network element 101 is configured to: obtain an identifier of a user plane function network element serving a terminal and session information of the terminal; determine, based on the identifier of the user plane function network element and the session information, an address pool identifier corresponding to a session; and then send the address pool identifier to the server 102.

The server 102 is configured to: receive the address pool identifier from the session management network element; assign an IP address to the session based on the address pool identifier; and then send, to the session management network element 101, the IP address corresponding to the session.

The session management network element 101 is further configured to receive, from the server 102, the IP address corresponding to the session.

Optionally, the server in this embodiment may be a dynamic host configuration protocol (DHCP) server or a network repository function network element. This is not specifically limited in this embodiment.

A difference from other approaches in which an address pool is partitioned into IP address segments and the IP address segments are configured on different session management network elements lies in that, in the address management system provided in this embodiment, the server may receive the address pool identifier from the session management network element and assign the IP address to the session based on the address pool identifier, and then send, to the session management network element, the IP address corresponding to the session. In other words, IP addresses in an address pool are managed together by the server. Therefore, a problem that a same IP address is assigned to different PDU sessions can be avoided, and the IP addresses in the address pool can be effectively used.

Alternatively, another possible implementation in the address management system 10 includes the following.

The session management network element 101 is configured to: obtain an identifier of a user plane function network element serving a terminal and session information of the terminal; determine, based on the identifier of the user plane function network element and the session information, an address pool identifier corresponding to a session; and then send the address pool identifier to the server 102.

The server 102 is configured to: receive the address pool identifier from the session management network element 101; determine a start address of a first IP address segment corresponding to the address pool identifier; and then send the start address of the first IP address segment to the session management network element 101.

The session management network element 101 is configured to: receive the start address of the first IP address segment from the server 102; and assign a first IP address to the session based on the start address of the first IP address segment.

Optionally, in this embodiment of this application, that the session management network element 101 is configured to assign a first IP address to the session based on the start address of the first IP address segment includes: determining the first IP address segment based on the start address of the first IP address segment and a length of the first IP address segment; and assigning the first IP address in the first IP address segment to the session.

Optionally, the server in this embodiment may be a DHCP server, a network repository function network element, or an authentication, authorization and accounting (AAA) server. This is not specifically limited in this embodiment.

A difference from other approaches in which an address pool is partitioned into IP address segments and the IP address segments are configured on different session management network elements lies in that, in the address management system provided in this embodiment, the server may receive the address pool identifier from the session management network element and determine the start address of the first IP address segment corresponding to the address pool identifier, and then send the start address of the first IP address segment to the session management network element 101. The session management network element may determine the first IP address segment based on the start address of the first IP address segment and the length of the first IP address segment, and then assign the first IP address in the first IP address segment to the session. In other words, IP address segments in an address pool are managed together by the server. Therefore, a problem that a same IP address is assigned to different PDU sessions can be avoided, and IP addresses in the address pool can be effectively used. In addition, because a start address of an IP address segment is configured on the server, obtaining an IP address from the server is equivalent to obtaining an IP address segment. In this way, the session management network element does not need to send, when each PDU session is to be established, signaling to the server to assign an IP address. Therefore, signaling exchange between the session management network element and the server due to IP address assignment can be greatly reduced, and system resources can be saved.

Figure 2:
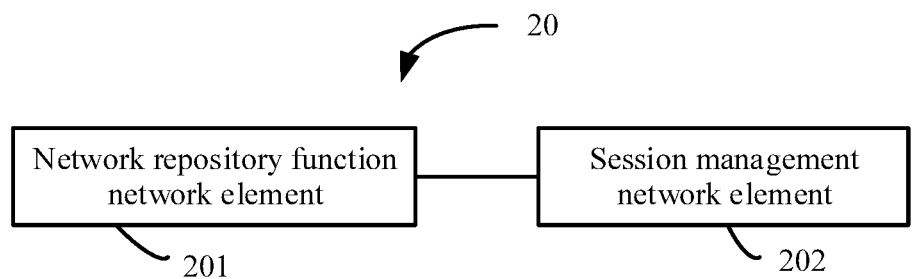
FIG. 2 is a schematic architectural diagram 2 of an address management system according to an embodiment of this application.

Optionally, FIG. 2 shows another address management system 20 according to an embodiment of this application. The address management system 20 may include a network repository function network element 201 and a session management network element 202.

The network repository function network element 201 is configured to: obtain an identifier of a user plane function network element serving a terminal and session information of the terminal; assign an IP address to a session based on the identifier of the user plane function network element and the session information; and then send, to the session management network element 202, the IP address corresponding to the session.

The session management network element 202 is configured to receive, from the network repository function network element 201, the IP address corresponding to the session.

Optionally, the network repository function network element 201 and the session management network element 202 in this embodiment may directly communicate with each other, or may communicate with each other through forwarding by another device. This is not specifically limited in this embodiment of this application.

A difference from other approaches in which an address pool is partitioned into IP address segments and the IP address segments are configured on different session management network elements lies in that, in the address management system provided in this embodiment, the network repository function network element may assign the IP address to the session based on the identifier of the user plane function network element and the session information, and then send, to the session management network element, the IP address corresponding to the session. In other words, IP addresses in an address pool are managed together by the network repository function network element. Therefore, a problem that a same IP address is assigned to different PDU sessions can be avoided, and the IP addresses in the address pool can be effectively used.

Optionally, the address management system shown in FIG. 1 or FIG. 2 may be applied to a current 5G network and another future network. This is not specifically limited in the embodiments of the present disclosure.

Figure 3:
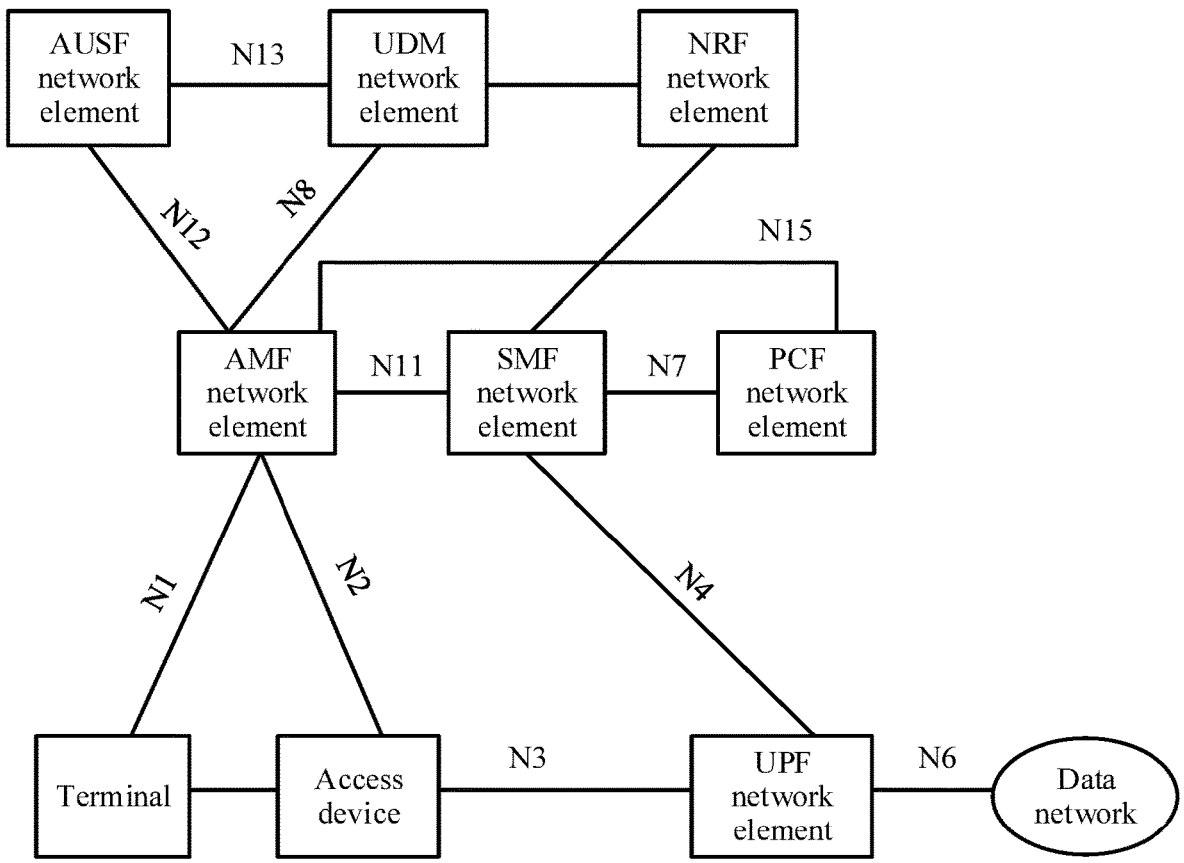
FIG. 3 is a schematic architectural diagram of a 5G network according to an embodiment of this application.

For example, it is assumed that the address management system shown in FIG. 1 or FIG. 2 may be applied to a current 5G network. As shown in FIG. 3, a network element or an entity corresponding to the foregoing session management network element may be an SMF network element in the 5G network, and a network element or an entity corresponding to the foregoing network repository function network element may be a network function repository function (NRF) network element in the 5G network.

In addition, as shown in FIG. 3, the 5G network may further include an access device, an access and mobility management function (AMF) network element, a UPF network element, a unified data management (UDM) network element, a policy control function (PCF) network element, an authentication server function (AUSF) network element, and some network elements that are not shown, for example, a DHCP server. This is not specifically limited in the embodiments of this application.

As shown in FIG. 3, in this embodiment of this application, a terminal accesses a 5G core network via the access device. The terminal communicates with the AMF network element through a next generation (N) interface 1 (N1). The access device communicates with the AMF network element through an N2 interface (N2). The access device communicates with the UPF network element through an N3 interface (N3). The AMF network element communicates with the SMF network element through an N11 interface (N11). The AMF network element communicates with the UDM network element through an N8 interface (N8). The AMF network element communicates with the AUSF network element through an N12 interface (N12). The AMF network element communicates with the PCF network element through an N15 interface (N15). The SMF network element communicates with the PCF network element through an N7 interface (N7). The SMF network element communicates with the UPF network element through an N4 interface (N4). The NRF network element communicates with both the UPF network element and the SMF network element. The UPF network element accesses a data network through an N6 interface (N6).

It should be noted that, names of the interfaces between the network elements in FIG. 3 are merely examples and the interfaces may have other names in other implementations. This is not specifically limited in the embodiments of this application.

It should be noted that, the terminal, the access device, the NRF network element, the AMF network element, the SMF network element, the UPF network element, the AUSF network element, the UDM network element, the PCF network element, or the like in FIG. 3 is merely a name, and the name constitutes no limitation on the device. In the 5G network and another future network, a network element or an entity corresponding to the terminal, the access device, the AMF network element, the SMF network element, the UPF network element, the AUSF network element, the UDM network element, or the PCF network element may have another name. This is not specifically limited in the embodiments of this application. For example, the UPF network element may alternatively be replaced by a UPF or a UPF entity. The UDM network element may alternatively be replaced by a home subscriber server (HSS), a user subscription database (USD) entity, a database entity, or the like. A general description is provided herein, and details are not described below.

Optionally, the terminal in the embodiments of this application may include various handheld devices, vehicle-mounted devices, wearable devices, and computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, a user equipment (UE), a mobile station (MS), a terminal device, relay user equipment, or the like. The relay user equipment may be, for example, a 5G residential gateway (RG). For ease of description, the devices mentioned above are collectively referred to as the terminal in this application.

Optionally, the access device in the embodiments of this application is a device for accessing the core network. For example, the access device may be a base station, a broadband network gateway (BNG), an aggregation switch, or a non-3rd generation partnership project (non-3GPP) access network element. The base station may include base stations in various forms, such as a macro base station, a micro base station (also referred to as a small cell), a relay station, and an access point.

Optionally, in the embodiments of this application, the session management network element or the server in FIG. 1, or the mobility management network element or the terminal in FIG. 2 may be implemented by one device, or may be implemented by a plurality of devices together, or may be implemented by one functional module in one device. This is not specifically limited in the embodiments of this application. It can be understood that, the foregoing network elements may be network elements in a hardware device, or may be software functions running on dedicated hardware, or may be virtualization functions instantiated on a platform (for example, a cloud platform).

Figure 4:
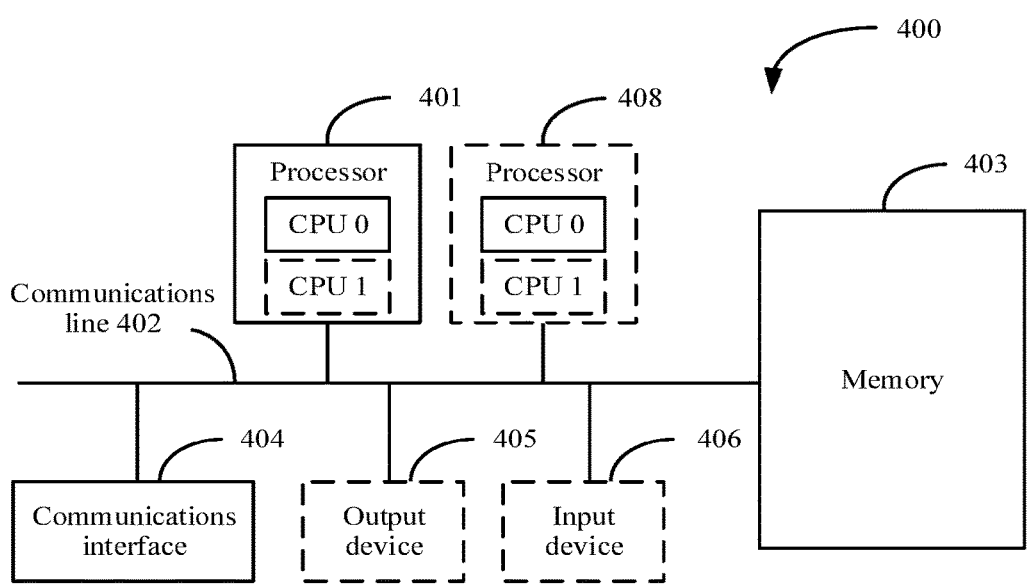
FIG. 4 is a schematic diagram of a hardware structure of a communications device according to an embodiment of this application.

For example, in the embodiments of this application, the session management network element, the terminal, or the user plane function network element in FIG. 1, or the network repository function network element or the session management network element in FIG. 2 may be implemented by a communications device in FIG. 4. FIG. 4 is a schematic diagram of a hardware structure of a communications device according to an embodiment of this application. The communications device 400 includes at least one processor 401, a communications line 402, a memory 403, and at least one communications interface 404.

The processor 401 may be a general-purpose central processing unit (CPU), a microprocessor, an application-specific integrated circuit (ASIC), or one or more integrated circuits configured to control program execution of the solutions of this application.

The communications line 402 may include a path to transfer information between the foregoing components.

The communications interface 404 is configured to communicate with another device or communications network, such as the Ethernet, a radio access network (RAN), or a wireless local area network (WLAN) using any apparatus such as a transceiver.

The memory 403 may be a read-only memory (ROM) or another type of static storage device that can store static information and instructions, or a random-access memory (RAM) or another type of dynamic storage device that can store information and instructions. Alternatively, the memory 403 may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and can be accessed by a computer. However, the memory 403 is not limited thereto. The memory 403 may exist independently, and is connected to the processor through the communications line 402. The memory 403 may alternatively be integrated with the processor 401.

The memory 403 is configured to store a computer-executable instruction for executing the solutions of this application, and the processor 401 controls the execution. The processor 401 is configured to execute the computer-executable instruction stored in the memory 403, to implement an address management method provided in the following embodiments of this application.

Optionally, the computer-executable instruction in this embodiment of this application may also be referred to as application program code. This is not specifically limited in this embodiment of this application.

During implementation, in an embodiment, the processor 401 may include one or more CPUs, for example, a CPU 0 and a CPU 1 in FIG. 4.

During implementation, in an embodiment, the communications device 400 may include a plurality of processors, for example, the processor 401 and a processor 408 in FIG. 4. Each of the processors may be a single-core (single-CPU) processor or a multi-core (multi-CPU) processor. The processor herein may be one or more devices, circuits, and/or processing cores for processing data (for example, computer program instructions).

During implementation, in an embodiment, the communications device 400 may further include an output device 405 and an input device 406. The output device 405 communicates with the processor 401, and may display information in a plurality of manners. For example, the output device 405 may be a liquid-crystal display (LCD), a light-emitting diode (LED) display device, a cathode-ray tube (CRT) display device, or a projector. The input device 406 communicates with the processor 401, and may receive an input of a user in a plurality of manners. For example, the input device 406 may be a mouse, a keyboard, a touchscreen device, or a sensor device.

The communications device 400 may be a general-purpose device or a dedicated device. During implementation, the communications device 400 may be a desktop computer, a portable computer, a network server, a personal digital assistant (PDA), a mobile phone, a tablet computer, a wireless terminal device, an embedded device, or a device with a structure similar to that in FIG. 4. A type of the communications device 400 is not limited in this embodiment of this application.

The following describes in detail an address management method provided in the embodiments of this application with reference to FIG. 1 to FIG. 4.

It should be noted that, names of messages or parameters in messages between network elements in the following embodiments of this application are merely examples, and the messages or the parameters may have other names in other implementations. This is not specifically limited in the embodiments of this application.

Figure 5:
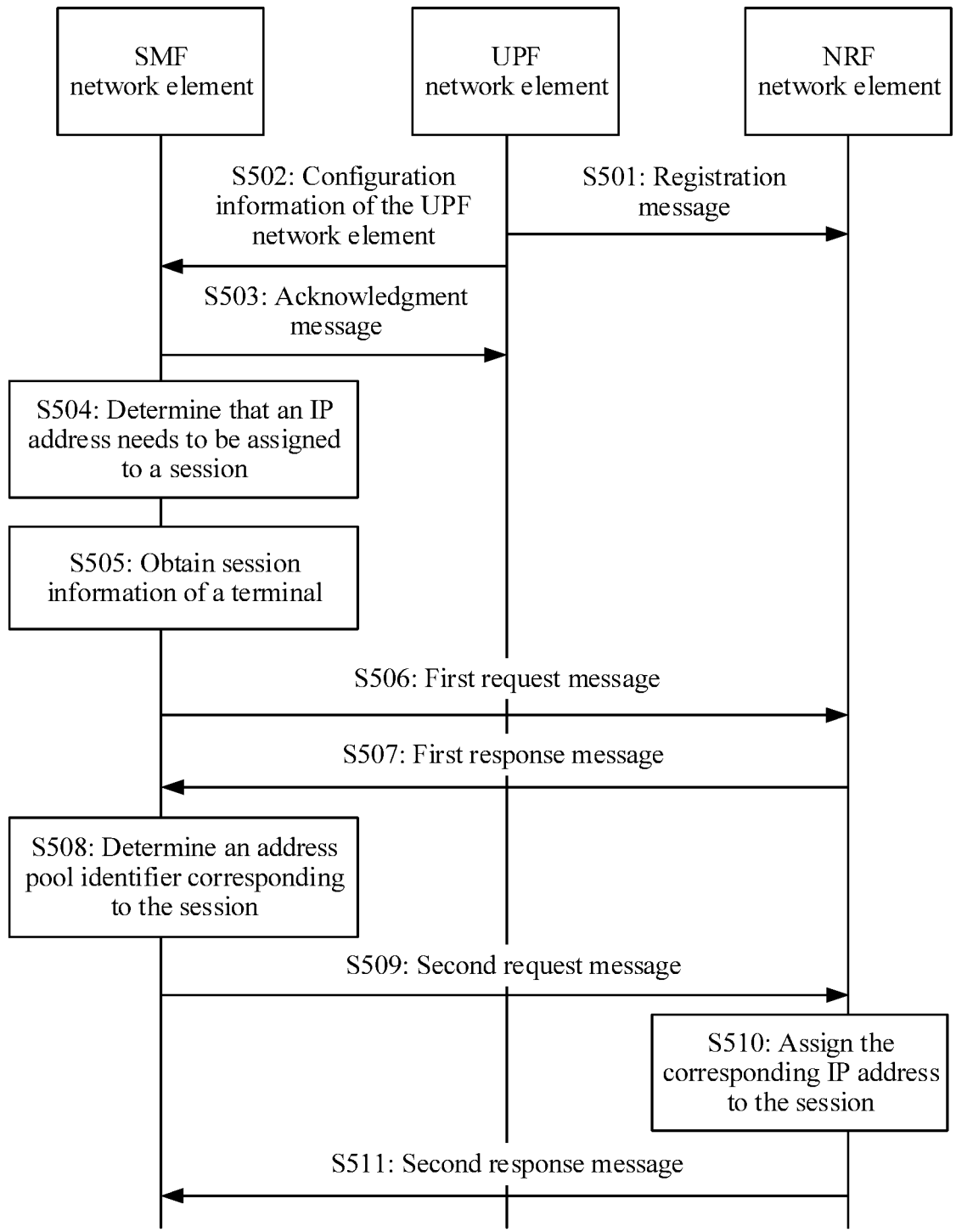
FIG. 5 is a schematic flowchart 1 of an address management method according to an embodiment of this application.

For example, the address management system shown in FIG. 1 is applied to the 5G network shown in FIG. 3, and the server shown in FIG. 1 is the NRF network element in the 5G network. FIG. 5 shows an address management method according to an embodiment of this application. The address management method includes the following steps.

S501: A UPF network element sends a registration message to an NRF network element when the UPF network element is powered on or a configuration is changed, and the NRF network element receives the registration message from the UPF network element.

The registration message carries information about an address pool managed by the UPF network element. For example, the information includes an address pool identifier of each address pool managed by the UPF network element and the address pool corresponding to the address pool identifier. Alternatively, the information includes an identifier of the UPF network element, an address pool identifier of each address pool managed by the UPF network element, and the address pool corresponding to the address pool identifier. This is not specifically limited in this embodiment.

In other words, in this embodiment, the UPF network element registers, with the NRF network element, the address pool managed by the UPF network element, and address pools of UPF network element are managed together by the NRF network element. Information that is about address pools and is configured on the NRF network element may be shown in Table 1.

TABLE 1

| Address pool | Address pool identifier | Identifier of a UPF network element | Data network name (DNN) |
|---|---|---|---|
| Address 1 to address 100 | Identifier 1 | UPF 1 | DNN 1 |
| Address 101 to address 200 | Identifier 2 | UPF 1 | DNN 2 |
| Address 201 to address 300 | Identifier 3 | UPF 1 | DNN 3 |
| . . . | . . . | . . . | . . . |
| Address 301 to address 400 | Identifier 7 | UPF 3 | DNN 7 |
| . . . | . . . | . . . | . . . |
| Address 601 to | Identifier 4 | UPF 2 | DNN 4 |

TABLE 1-continued

| Address pool | Address pool identifier | Identifier of a UPF network element | Data network name (DNN) |
|---|---|---|---|
| address 700 | | | |
| Address 701 to address 800 | Identifier 5 | UPF 2 | DNN 5 |
| . . . | . . . | . . . | . . . |

In Table 1, description is provided using an example in which each of one or more data networks corresponding to one UPF network element corresponds to one address pool. Certainly, each of one or more data networks corresponding to one UPF network element may alternatively correspond to a plurality of address pools. For example, a data network corresponding to the DNN 3 corresponds to two address pools. In this case, information that is about address pools and is configured on the NRF network element may be shown in Table 2. This is not specifically limited in this embodiment.

TABLE 2

| Address pool | Address pool identifier | Identifier of a UPF network element | DNN |
|---|---|---|---|
| Address 1 to address 100 | Identifier 1 | UPF 1 | DNN 1 |
| Address 101 to address 200 | Identifier 2 | UPF 1 | DNN 2 |
| Address 201 to address 300 | Identifier 3 | UPF 1 | DNN 3 |
| Address 401 to address 500 | Identifier 8 | UPF 1 | DNN 3 |
| . . . | . . . | . . . | . . . |
| Address 301 to address 400 | Identifier 7 | UPF 3 | DNN 7 |
| . . . | . . . | . . . | . . . |
| Address 601 to address 700 | Identifier 4 | UPF 2 | DNN 4 |
| Address 701 to address 800 | Identifier 5 | UPF 2 | DNN 5 |
| . . . | . . . | . . . | . . . |

Optionally, information that is about the address pool and is configured by the UPF network element on the NRF network element in this embodiment may include only the address pool and the address pool identifier in Table 1 or Table 2. Alternatively, in addition to the address pool, the address pool identifier, the identifier of the UPF network element, and the DNN in Table 1 or Table 2, information that is about the address pool and is configured by the UPF network element on the NRF network element in this embodiment may include other information such as an IP address version. This is not specifically limited in this embodiment.

Optionally, an address pool identifier in this embodiment is used to uniquely identify one address pool. The address pool identifier may include at least one of an identifier of a UPF network element, a DNN, an IP address pool version, a start address of the address pool, or another address that can uniquely identify the address pool.

For example, referring to Table 1 or Table 2, when the UPF 3 network element supports only a data network corresponding to the DNN 7, and the data network corresponds to only one address pool, the identifier 7 may be the UPF 3 or the DNN 7.

Alternatively, for example, referring to Table 1, when the UPF 2 network element supports data networks corresponding to the DNN 4 and DNN 5, and each data network corresponds to one address pool, the identifier 4 may be the DNN 4, or the DNN 4 and the UPF 2, or the address 601, and the identifier 5 may be the DNN 5, or the DNN 5 and the UPF 2, or the address 701.

Alternatively, for example, referring to Table 2, the UPF 1 network element supports a data network corresponding to the DNN 3, and the data network corresponds to two address pools. One IP address version is the Internet Protocol version 4 (IPv4), and the other IP address version is the Internet Protocol version 6 (IPv6). In this case, the identifier 3 may be the DNN 3 and the IPv4, and the identifier 8 may be the DNN 3 and the IPv6. Alternatively, the identifier 3 may be the UPF 1, the DNN 3, and the IPv4, and the identifier 8 may be the UPF 1, the DNN 3, and the IPv6.

Alternatively, for example, referring to Table 2, when the UPF 1 network element supports data networks corresponding to the DNN 1, DNN 2, and DNN 3, and the data network corresponding to the DNN 3 corresponds to two address pools, the identifier 3 may be the DNN 3 and a first parameter, and the identifier 8 may be the DNN 3 and a second parameter. This is not specifically limited in this embodiment.

It should be noted that the foregoing merely enumerated several possible representation forms of the address pool identifier as examples. Certainly, the address pool identifier in this embodiment may alternatively have another representation form, for example, a unique identifier different from the start address of the address pool or the DNN or the IP address version. This is not specifically limited in this embodiment.

Optionally, the registration message in this embodiment may further carry existing information, for example, single network slice selection assistance information (S-NSSAI) of a network slice supported by the UPF network element, or a capacity of the UPF network element. For details, refer to an existing implementation. Details are not described herein.

Optionally, in this embodiment, description is provided merely using an example in which the UPF network element sends the registration message to the NRF network element. Certainly, the registration message may alternatively be sent by another network element, for example, an operation administration and maintenance (OAM) network element to the NRF network element when the UPF network element is powered on or the configuration is changed. This is not specifically limited in this embodiment.

S502: The UPF network element sends configuration information of the UPF network element to an SMF network element when the UPF network element is powered on or the configuration is changed, and the SMF network element receives the configuration information of the UPF network element from the UPF network element.

The configuration information of the UPF network element may include, for example, the identifier of the UPF network element, the address pool identifier of the address pool managed by the UPF network element, and session information corresponding to the identifier of the UPF network element and the address pool identifier, as shown in Table 3.

TABLE 3

| Identifier of the UPF network element | Session information | Address pool identifier |
|---|---|---|
| UPF 1 | Session information 1 | Identifier 1 |
| UPF 1 | Session information 2 | Identifier 2 |
| UPF 1 | Session information 3 | Identifier 3 |
| ... | ... | ... |

Optionally, the session information in this embodiment may include, for example, at least one of an address pool selection policy, a DNN, or an IP address version. This is not specifically limited in this embodiment. The address pool selection policy in this embodiment may be information that is obtained from a PCF network element and is used to assist in selecting an address pool. For example, the address pool selection policy may be a session-specific policy, or an address pool identifier such as information that uniquely identifies an address pool and is on a UPF network element. This is not specifically limited in this embodiment.

For a related description of the address pool identifier, refer to step S501. Details are not described herein.

Optionally, in this embodiment, description is provided merely using an example in which the UPF network element sends the configuration information of the UPF network element to the SMF network element. Certainly, the configuration information of the UPF network element may alternatively be sent by another network element, for example, the OAM network element, to the SMF network element when the UPF network element is powered on or the configuration is changed. This is not specifically limited in this embodiment.

Optionally, in this embodiment, there is no necessary execution sequence between steps S501 and S502. Step S501 may be performed before or after step S502, or steps S501 and S502 may be performed simultaneously. This is not specifically limited in this embodiment.

S503: The SMF network element sends an acknowledgment message to the UPF network element, and the UPF network element receives the acknowledgment message from the SMF network element.

The acknowledgment message is used to indicate that the SMF network element has received the configuration information of the UPF network element.

S504: The SMF network element determines that an IP address needs to be assigned to a session.

Optionally, in this embodiment, when the SMF network element receives a PDU session establishment request message sent by a terminal, the SMF network element may determine that the IP address needs to be assigned to the session. Alternatively, when the SMF network element determines that a local anchor needs to be inserted for a terminal (multi-homing mode), the SMF network element may determine that the IP address needs to be assigned to the session. This is not specifically limited in this embodiment.

S505: The SMF network element obtains session information of the terminal.

Optionally, the session information in this embodiment may include, for example, at least one of an address pool selection policy, a DNN, or an IP address version. This is not specifically limited in this embodiment.

Optionally, in this embodiment, if the SMF network element determines, when the SMF network element receives the PDU session establishment request message sent by the terminal, that the IP address needs to be assigned to the session, the SMF network element may obtain the session information from the PDU session establishment request message or may determine the session information based on subscription information of the terminal obtained from a UDM network element. If the SMF network element determines, when the SMF network element determines that the local anchor needs to be inserted for the terminal, that the IP address needs to be assigned to the session, the SMF network element may obtain the session information from a locally stored context. This is not specifically limited in this embodiment.

S506: The SMF network element sends a first request message to the NRF network element, and the NRF network element receives the first request message from the SMF network element.

The first request message carries location information of the terminal, and session requirement information, for example, information such as S-NSSAI and a DNN that correspond to the session. The session requirement information is used to select a UPF network element.

For a related implementation in which the NRF network element selects the UPF network element based on the session requirement information, refer to an existing implementation. Details are not described herein.

S507: The NRF network element sends a first response message to the SMF network element, and the SMF network element receives the first response message from the NRF network element. The first response message carries an identifier of the UPF network element.

Steps S506 and S507 provide an implementation in which the SMF network element obtains the identifier of the UPF network element. Certainly, the SMF network element may alternatively select the UPF network element based on the session requirement information, to obtain the identifier of the UPF network element. For details, refer to an existing implementation. Details are not described herein.

S508: The SMF network element determines an address pool identifier corresponding to the session, based on the address pool identifier corresponding to the identifier of the UPF network element and the session information in step S502, the identifier of the UPF network element in step S507, and the session information in step S505.

For example, if the session information is the session information 2 in Table 3, and the identifier of the UPF network element is the UPF 1, it can be learned from Table 3 that the address pool identifier corresponding to the session is the identifier 2.

S509: The SMF network element sends a second request message to the NRF network element, and the NRF network element receives the second request message from the SMF network element.

The second request message carries the address pool identifier, and is used to request to assign the corresponding IP address to the session.

Optionally, in this embodiment, the second request message may further carry the identifier of the UPF network element and an interface type of a tunnel corresponding to the session. The second request message is used to allocate corresponding tunnel information to the session. This is not specifically limited in this embodiment.

Optionally, in this embodiment, the interface type of the tunnel corresponding to the session may be, for example, an N3 interface or an N9 interface. This is not specifically limited in this embodiment.

Optionally, the tunnel information in this embodiment may include, for example, a tunnel identifier and a tunnel IP address. This is not specifically limited in this embodiment.

S510: The NRF network element assigns, based on the address pool identifier, the corresponding IP address to the session.

Optionally, in this embodiment, the NRF network element may determine an address pool according to the address pool identifier, based on the address pool identifier and with reference to Table 1 or Table 2. Then, the NRF network element may assign an IP address in the address pool to the session. For example, the NRF network element may assign, to the session, an unused IP address in the address pool corresponding to the session. Alternatively, if the address pool identifier is unique within a scope of the UPF network element, the NRF network element determines an address pool corresponding to the address pool identifier, based on the address pool identifier and the identifier of the UPF network element and with reference to Table 1 or Table 2.

Optionally, if the second request message in this embodiment further carries the identifier of the UPF network element and the interface type of the tunnel corresponding to the session, the NRF network element further allocates the corresponding tunnel information to the session based on the identifier of the UPF network element and the interface type of the tunnel corresponding to the session. In a possible implementation, the NRF network element selects, for the session from interface tunnel information space of the UPF network element corresponding to the identifier of the UPF network element, a tunnel identifier and a tunnel IP address that correspond to the interface type. For example, if the interface type of the tunnel corresponding to the session is the N3 interface, the NRF network element selects an unallocated tunnel identifier and an unassigned tunnel IP address for the session from N3 interface tunnel information space of the UPF network element corresponding to the identifier of the UPF network element. Alternatively, if the interface type of the tunnel corresponding to the session is the N9 interface, the NRF network element selects an unallocated tunnel identifier and an unassigned tunnel IP address for the session from N9 interface tunnel information space of the UPF network element corresponding to the identifier of the UPF network element. Certainly, a manner of managing the tunnel information provided in this embodiment may also be applied to another scenario, for example, a scenario in which an IP address is managed in another manner. This is not specifically limited in this embodiment.

S511: The NRF network element sends a second response message to the SMF network element, and the SMF network element receives the second response message from the NRF network element.

The second response message carries the IP address corresponding to the session.

Optionally, if the NRF network element further allocates the corresponding tunnel information to the session, the second response message further carries the tunnel information corresponding to the session. This is not specifically limited in this embodiment.

A difference from other approaches in which an address pool is partitioned into IP address segments and the IP address segments are configured on different SMF network elements lies in that, in the address management method provided in this embodiment, the NRF network element may receive the address pool identifier from the SMF network element and assign the IP address to the session based on the address pool identifier, and then send, to the SMF network element, the IP address corresponding to the session. In other words, IP addresses in an address pool are managed together by the NRF network element. Therefore, a problem that a same IP address is assigned to different PDU sessions can be avoided, and the IP addresses in the address pool can be effectively used. In addition, in this embodiment, the NRF network element may centrally allocate tunnel information. Therefore, a problem that same tunnel information is allocated to different PDU sessions can also be avoided.

Actions of the SMF network element or the NRF network element in steps S501 to S511 may be performed by the processor 401 in the communications device 400 shown in FIG. 4 by invoking the application program code stored in the memory 403. This is not limited in this embodiment.

Figure 6:
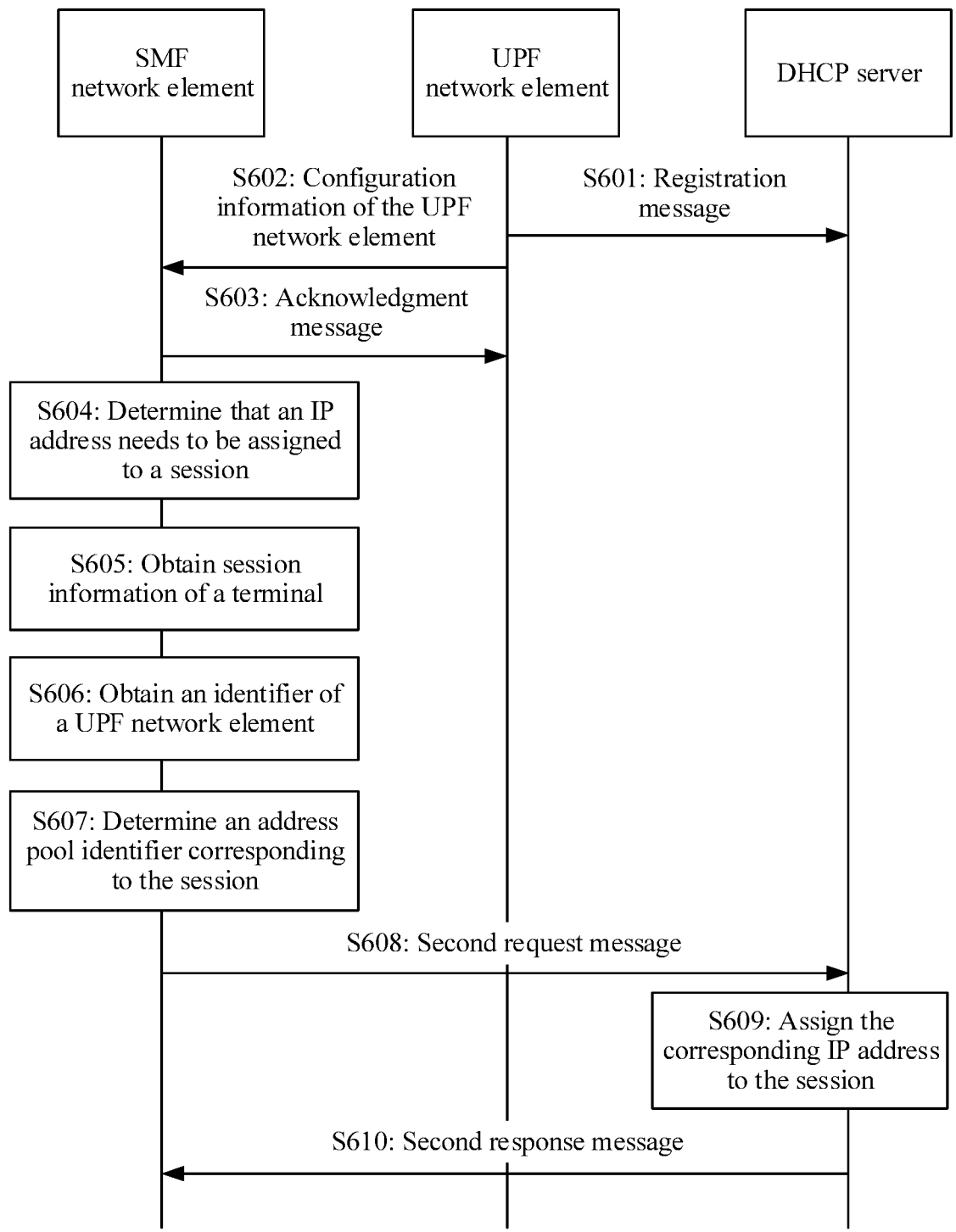
FIG. 6 is a schematic flowchart 2 of an address management method according to an embodiment of this application.

Optionally, for example, the address management system shown in FIG. 1 is applied to the 5G network shown in FIG. 3, and the server shown in FIG. 1 is a DHCP server. FIG. 6 shows another address management method according to an embodiment of this application. The address management method includes the following steps.

S601 is similar to step S501. A difference lies in that, the NRF network element in step S501 is replaced by a DHCP server in step S601. For a related description, refer to the embodiment shown in FIG. 5. Details are not described herein.

S602 to S605 are the same as steps S501 to S505. For related descriptions, refer to the embodiment shown in FIG. 5. Details are not described herein.

S606: The SMF network element obtains an identifier of a UPF network element serving the terminal.

Optionally, in this embodiment, the SMF network element may alternatively select a UPF network element based on session requirement information, to obtain an identifier of the UPF network element. For details, refer to an existing implementation. Details are not described herein.

S607 is the same as step S508. For a related description, refer to the embodiment shown in FIG. 5. Details are not described herein.

S608 to S610 are similar to steps S509 to S511. A difference lies in that, the NRF network element in steps S509 to S511 is replaced by the DHCP server in steps S608 to S610. For related descriptions, refer to the embodiment shown in FIG. 5. Details are not described herein.

In addition, optionally, a request message in this embodiment may be a DHCP request or a DHCP discover message. Correspondingly, a response message in this embodiment may be a DHCP response and a DHCP offer message.

When an address pool identifier is an IP address, the address pool identifier in this embodiment may be carried in a GIADDR field of the request message. Additionally, the DHCP server may query a corresponding address pool based on the IP address in the GIADDR field, and assign an IP address in the address pool.

Alternatively, when an address pool identifier is not an IP address, the address pool identifier in this embodiment is carried in an extended DHCP relay agent information option of the request message. For example, a field of the identifier of the UPF network element and a DNN field are added to the extended DHCP relay agent information option. In this way, when the address pool identifier is the identifier of the UPF network element and a DNN, the DHCP server may query a corresponding address pool based on the identifier of the UPF network element and the DNN in the extended DHCP relay agent information option, and assign an IP address in the address pool.

Alternatively, when an address pool identifier includes address information, the address information in the address pool identifier may be carried in a GIADDR field, and other information may be carried in an extended DHCP relay agent information option of the request message. For example, when the address pool identifier is the identifier of the UPF network element and a DNN, and the identifier of the UPF network element is an IP address of the UPF network element, the identifier of the UPF network element may be carried in the GIADDR field, and the DNN may be carried in a DHCP relay agent information option. In this way, after obtaining the identifier of the UPF network element and the DNN from GIADDR and the DHCP relay agent information option respectively, the DHCP server queries a corresponding address pool, and assigns an IP address in the address pool.

It should be noted that, that the address pool identifier in this embodiment is not an IP address means that the address pool identifier does not include an IP address only or the address pool identifier does not include an IP address. For example, the address pool identifier is the identifier of the UPF network element and the DNN. Alternatively, the address pool identifier is the identifier of the UPF network element and a start address of an address pool. A general description is provided herein, and details are not described below.

A difference from other approaches in which an address pool is partitioned into IP address segments and the IP address segments are configured on different SMF network elements lies in that, in the address management method provided in this embodiment, the DHCP server may receive the address pool identifier from the SMF network element and assign the IP address to the session based on the address pool identifier, and then send, to the SMF network element, the IP address corresponding to the session. In other words, IP addresses in an address pool are managed together by the DHCP server. Therefore, a problem that a same IP address is assigned to different PDU sessions can be avoided, and the IP addresses in the address pool can be effectively used. In addition, in this embodiment, the DHCP server may centrally allocate tunnel information. Therefore, a problem that same tunnel information is allocated to different PDU sessions can also be avoided.

Actions of the SMF network element or the DHCP server in steps S601 to S610 may be performed by the processor 401 in the communications device 400 shown in FIG. 4 by invoking the application program code stored in the memory 403. This is not limited in this embodiment.

Figure 7:
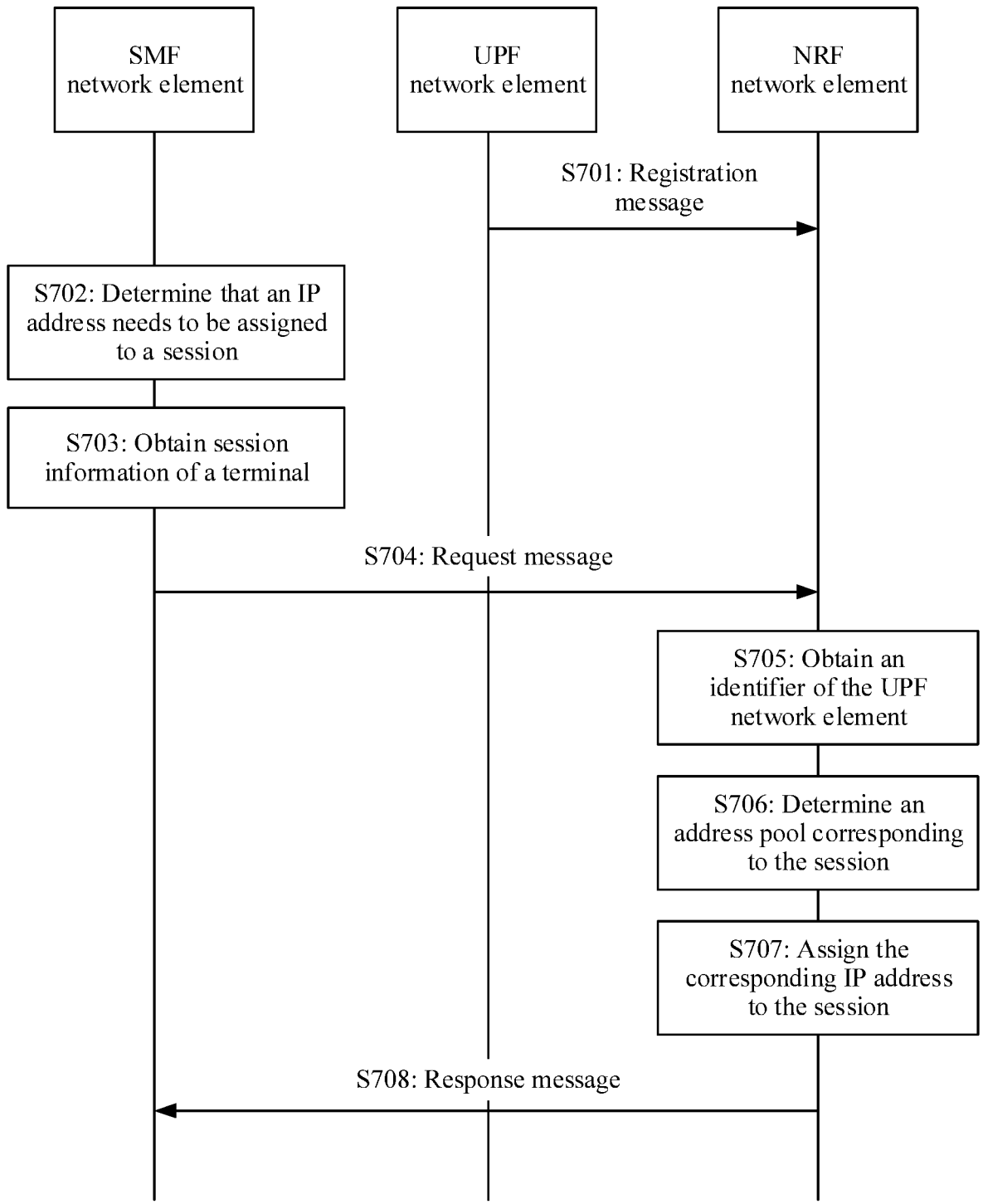
FIG. 7 is a schematic flowchart 3 of an address management method according to an embodiment of this application.

Optionally, for example, the address management system shown in FIG. 2 is applied to the 5G network shown in FIG. 3. FIG. 7 shows still another address management method according to an embodiment of this application. The address management method includes the following steps.

S701: A UPF network element sends a registration message to an NRF network element when the UPF network element is powered on or a configuration is changed, and the NRF network element receives the registration message from the UPF network element.

Optionally, the registration message may carry information about an address pool managed by the UPF network element as in step S501 and carry configuration information of the UPF network element as in step S502. Alternatively, the registration message may carry an identifier of the UPF network element, each address pool managed by the UPF network element, and session information corresponding to the identifier of the UPF network element and the address pool, as shown in Table 4. This is not specifically limited in this embodiment.

TABLE 4

| Identifier of the UPF network element | Session information | Address pool |
|---|---|---|
| UPF 1 | Session information 1 | Address 1 to address 100 |
| UPF 1 | Session information 2 | Address 101 to address 200 |
| UPF 1 | Session information 3 | Address 201 to address 300 |
| ... | ... | ... |
| UPF 3 | Session information 4 | Address 301 to address 400 |
| ... | ... | ... |
| UPF 2 | Session information 5 | Address 601 to address 700 |
| UPF 2 | Session information 6 | Address 701 to address 800 |
| ... | ... | ... |

S702 and S703 are the same as steps S504 and S505. For related descriptions, refer to the embodiment shown in FIG. 5. Details are not described herein.

S704: The SMF network element sends a request message to the NRF network element, and the SMF network element receives the request message from the SMF network element.

The request message carries session information, and is used to request to assign a corresponding IP address to a session. For a related description of the session information, refer to step S502. Details are not described herein.

Optionally, the request message in this embodiment further carries location information of the terminal and session requirement information, for example, information such as S-NSSAI and a DNN that correspond to the session, where the session requirement information is used by the NRF network element to select a UPF network element. This is not specifically limited in this embodiment. Alternatively, if the SMF network element selects a UPF network element, the request message may further carry an identifier of the UPF network element. This is not specifically limited in this embodiment.

Optionally, in this embodiment, the request message may further carry an interface type of a tunnel corresponding to the session. The interface type of the tunnel corresponding to the session is used to allocate corresponding tunnel information to the session. This is not specifically limited in this embodiment. For related descriptions of the interface type of the tunnel and the tunnel information, refer to the embodiment shown in FIG. 5. Details are not described herein.

S705: The NRF network element obtains the identifier of the UPF network element.

Optionally, the identifier of the UPF network element may be carried in the request message in step S704, or may be obtained after the NRF network element selects the UPF network element. This is not specifically limited in this embodiment.

S706: The NRF network element determines, based on the identifier of the UPF network element and the session information, an address pool corresponding to the session.

Optionally, in this embodiment, the NRF network element may determine, based on the identifier of the UPF network element and the session information and with reference to Table 4, the address pool corresponding to the session. Alternatively, the NRF network element may determine a corresponding address pool identifier based on the identifier of the UPF network element and the session information and with reference to Table 3, and then determine, with reference to Table 1 or Table 2, an address pool corresponding to the address pool identifier. This is not specifically limited in this embodiment.

S707: The NRF network element assigns, to the session, the IP address in the address pool corresponding to the session.

For example, the NRF network element may assign, to the session, an unused IP address in the address pool corresponding to the session.

Optionally, in this embodiment, the NRF network element may further allocate the corresponding tunnel information to the session. For a related description, refer to the embodiment shown in FIG. 5. Details are not described herein.

S708: The NRF network element sends a response message to the SMF network element, and the SMF network element receives the response message from the NRF network element.

The response message carries the IP address corresponding to the session.

Optionally, if the NRF network element further allocates the corresponding tunnel information to the session, the response message further carries the tunnel information corresponding to the session. This is not specifically limited in this embodiment.

Optionally, in this embodiment, if the NRF network element selects a UPF network element, the response message further carries an identifier of the UPF network element. This is not specifically limited in this embodiment.

A difference from other approaches in which an address pool is partitioned into IP address segments and the IP address segments are configured on different SMF network elements lies in that, in the address management method provided in this embodiment, the NRF network element may assign the IP address to the session based on the identifier of the UPF network element and the session information, and then send, to the SMF network element, the IP address corresponding to the session. In other words, IP addresses in an address pool are managed together by the NRF network element. Therefore, a problem that a same IP address is assigned to different PDU sessions can be avoided, and the IP addresses in the address pool can be effectively used. In addition, in this embodiment, the NRF network element may centrally allocate tunnel information. Therefore, a problem that same tunnel information is allocated to different PDU sessions can also be avoided.

Actions of the SMF network element or the NRF network element in steps S701 to S708 may be performed by the processor 401 in the communications device 400 shown in FIG. 4 by invoking the application program code stored in the memory 403. This is not limited in this embodiment.

Figure 10:
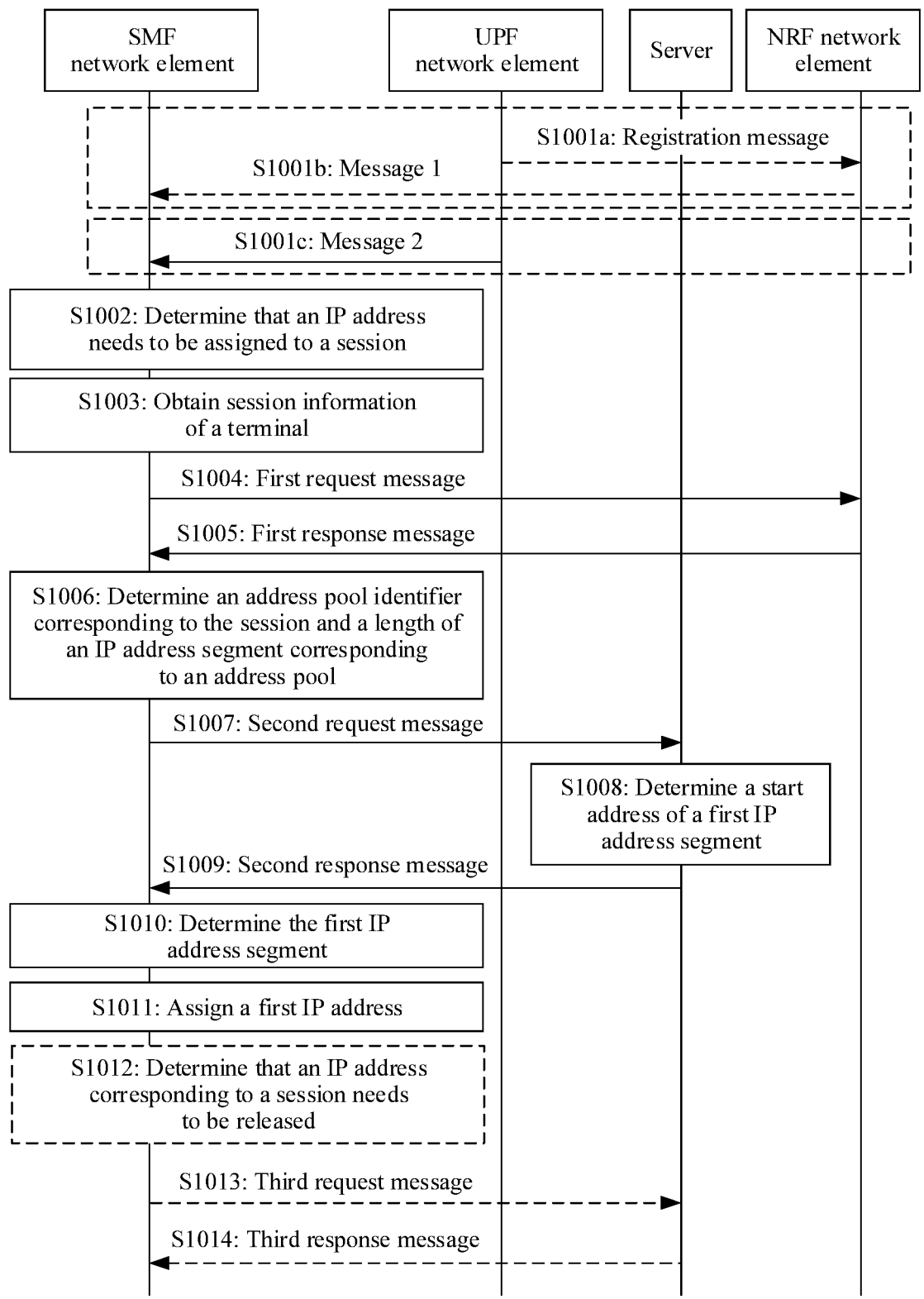
FIG. 10 is a schematic flowchart 4 of an address management method according to an embodiment of this application.

Optionally, for example, the address management system shown in FIG. 1 is applied to the 5G network shown in FIG. 3. FIG. 10 shows yet another address management method according to an embodiment of this application. The address management method includes steps S1001a and S1001b, or includes step S1001c.

S1001a: A UPF network element sends a registration message to an NRF network element when the UPF network element is powered on or a configuration is changed, and the NRF network element receives the registration message from the UPF network element.

Figure 11:
FIG. 11 is a schematic diagram of management of addresses in address pools according to an embodiment of this application.

In this embodiment of this application, an address pool corresponding to the UPF network element is partitioned into IP address segments having an equal length. For example, as shown in FIG. 11, it is assumed that there are m×n addresses in the address pool, where both m and n are positive integers, and a length of each IP address segment is n. In this case, there are m IP address segments in total in the addresses pool corresponding to the UPF network element. Start addresses of all of the m IP address segments are IP11, IP21, . . . , and IPm1. IP addresses in each of the m IP address segments are IPs1, IPs2, . . . , and IPsn, where a value of s ranges from 1 to m.

Further, the registration message in this embodiment of this application may include a length of the IP address segment.

Optionally, in a possible implementation, the length of the IP address segment may be carried in the registration message as an attribute of the UPF network element. This is not specifically limited in this embodiment of this application.

Optionally, in this embodiment of this application, if the UPF network element may correspond to a plurality of address pools, the registration message may include lengths of IP address segments corresponding to the plurality of address pools, for example, a length 1 of an IP address segment corresponding to an address pool 1 and a length 2 of an IP address segment corresponding to an address pool 2. The length 1 of the IP address segment and the length 2 of the IP address segment may be the same or different. This is not specifically limited in this embodiment of this application.

Optionally, the registration message in this embodiment of this application may further carry session information corresponding to the address pool. The session information may be, for example, at least one of a DNN, S-NSSAI, an IP address version, an identifier of the UPF network element, or an address pool selection policy. This is not specifically limited in this embodiment of this application. In other words, in this case, for each address pool, the UPF network element carries corresponding information (session information, a length of an IP address segment) in the registration message. The session information and the length of the IP address segment indicate session information and a length of an IP address segment. A general description is provided herein. For a subsequent similar format, refer to the description herein, and details are not described again.

It should be noted that, in this embodiment of this application, if address segments of all address pools supported by the UPF network element have a same length, the UPF network element may not send a length of an IP address segment for each address pool, but send a length of one IP address segment for all the address pools. In this way, the UPF network element carries, in the registration message, a length of only one IP address segment and session information corresponding to one or more address pools supported by the UPF network element. This is not specifically limited in this embodiment of this application.

For example, if the UPF network element may support two DNNs, namely, a DNN 1 and a DNN 2, and the two DNNs correspond to different address pools, the registration message may carry corresponding information (the DNN 1, a length 1 of an IP address segment; and the DNN 2, a length 2 of an IP address segment). Alternatively, for example, if the UPF network element supports two pieces of S-NSSAI, namely, S-NSSAI 1 and S-NSSAI 2, the S-NSSAI 1 supports a DNN 1 and a DNN 2, the S-NSSAI 2 supports the DNN 2, and different DNNs of each network slice correspond to different address pools, the registration message may carry corresponding information (the S-NSSAI 1, the DNN 1, a length 1 of an IP address segment; the S-NSSAI 1, the DNN 2, a length 2 of an IP address segment; and the S-NSSAI 2, the DNN 2, a length 3 of an IP address segment).

Optionally, the registration message in this embodiment of this application may further carry an address pool identifier. In other words, in this case, for each address pool, the UPF network element carries corresponding information (session information, a length of an IP address segment, an address pool identifier) in the registration message. This is not specifically limited in this embodiment of this application. For a definition of the address pool identifier, refer to step S501 in the embodiment shown in FIG. 5. Details are not described herein.

Optionally, in this embodiment of this application, if the registration message does not carry an address pool identifier, the NRF network element may allocate a corresponding address pool identifier to each address pool. This is not specifically limited in this embodiment of this application.

Optionally, when the NRF network element serves as a server, the registration message in this embodiment of this application may further include a start address or start addresses of one or more IP address segments corresponding to the address pool. This is not specifically limited in this embodiment of this application.

Optionally, in this embodiment of this application, when the NRF network element serves as a server, if the registration message does not carry a start address or start addresses of one or more IP address segments corresponding to the address pool, alternatively, another network element may configure, on the NRF network element, the start address or start addresses of the one or more IP address segments corresponding to the address pool. For example, an OAM may configure, on the server, the start address or start addresses of the one or more IP address segments corresponding to the address pool. This is not specifically limited in this embodiment of this application.

Optionally, in this embodiment, description is provided merely using an example in which the UPF network element sends the registration message to the NRF network element. Certainly, the registration message may alternatively be sent by another network element, for example, the OAM to the NRF network element when the UPF network element is powered on or the configuration is changed. In this case, the UPF network element only needs to be replaced by the OAM. Details are not described herein.

S1001*b*: The NRF network element sends a message 1 to an SMF network element, and the SMF network element receives the message 1 from the NRF network element.

The message 1 includes the length of the IP address segment corresponding to the address pool, and the address pool identifier corresponding to the address pool.

Optionally, the message 1 may further include the identifier of the UPF network element corresponding to the address pool. For example, if the address pool identifier is unique within a global scope, the message 1 does not need to carry the identifier of the UPF network element. Alternatively, if the address pool identifier is unique within a scope of the UPF network element, the message 1 needs to carry the identifier of the UPF network element. This is not specifically limited in this embodiment of this application.

Optionally, in this embodiment of this application, if the SMF network element subscribes to a status change notification of the UPF network element, when the UPF network element goes online, the NRF network element may send an attribute of the UPF network element to the SMF network element. The attribute may include the length of the IP address segment corresponding to the address pool, and the address pool identifier corresponding to the address pool. Optionally, the attribute may further include the identifier of the UPF network element corresponding to the address pool. This is not specifically limited in this embodiment of this application.

Optionally, in this embodiment of this application, if the registration message in step S1001*a* includes the session information corresponding to the address pool, the message 1 may further include the session information corresponding to the address pool.

Optionally, in this embodiment of this application, if the registration message in step S1001*a* does not carry the session information corresponding to the address pool, or the identifier of the UPF network element corresponding to the address pool, the SMF network element may obtain, from the UPF network element or the OAM, the session information corresponding to the address pool, or the identifier of the UPF network element corresponding to the address pool. This is not specifically limited in this embodiment of this application.

In this case, for each address pool, the SMF network element may store a correspondence among an identifier of a UPF network element corresponding to the address pool, session information corresponding to the address pool, an address pool identifier, and a length of an IP address segment corresponding to the address pool, as shown in Table 5.

TABLE 5

| Identifier of the UPF network element | Session information | Address pool identifier | Length of the IP address segment |
|---|---|---|---|
| UPF 1 | Session information 1 | Identifier 1 | Length 1 |
| UPF 1 | Session information 2 | Identifier 2 | Length 2 |
| UPF 1 | Session information 3 | Identifier 3 | Length 3 |
| . . . | . . . | . . . | . . . |

Optionally, in this embodiment of this application, steps S1001a and S1001b may alternatively not be performed, but step S1001c may be performed.

S1001c: A UPF network element sends a message 2 to an SMF network element when the UPF network element is powered on or a configuration is changed, and the SMF network element receives the message 2 from the UPF network element.

The message 2 includes a length of an IP address segment that corresponds to an address pool corresponding to the UPF network element, and an address pool identifier corresponding to the address pool.

Optionally, the message 2 may further include an identifier of the UPF network element corresponding to the address pool. For example, if the address pool identifier is unique within a global scope, the message 2 does not need to carry the identifier of the UPF network element. Alternatively, if the address pool identifier is unique within a scope of the UPF network element, the message 2 needs to carry the identifier of the UPF network element. This is not specifically limited in this embodiment of this application.

If the message 2 includes the identifier of the UPF network element corresponding to the address pool, the identifier of the UPF network element may be explicitly carried in the message 2, or may be implicitly indicated by the message. For example, the identifier of the UPF network element may be source address information of the message 2. In this case, the identifier of the UPF network element does not need to be explicitly carried. This is not limited in this embodiment of this application.

Optionally, in this embodiment of this application, when the UPF network element is powered on or the configuration is changed, the UPF network element may send an attribute of the UPF network element to the SMF network element. The attribute may include the length of the IP address segment that corresponds to the address pool corresponding to the UPF network element, and the address pool identifier corresponding to the address pool. Optionally, the attribute may further include the identifier of the UPF network element corresponding to the address pool. This is not specifically limited in this embodiment of this application.

Optionally, in this embodiment of this application, the message 2 may further include the session information. Further, the SMF network element may store a correspondence among an identifier of a UPF network element, session information, an address pool identifier, and a length of an IP address segment corresponding to an address pool, as shown in Table 5. Details are not described herein.

Optionally, in this embodiment of this application, if the message 2 does not carry session information corresponding to the address pool, or the identifier of the UPF network element corresponding to the address pool, the SMF network element may alternatively obtain, in the manner in step S1001b, the session information corresponding to the address pool, or the identifier of the UPF network element corresponding to the address pool. This is not specifically limited in this embodiment of this application.

Certainly, in a method in addition to the method described in steps S1001a and S1001b, or in step S1001c, the SMF network element may alternatively obtain, from the OAM (in other words, the OAM configures on the SMF network element), the length of the IP address segment, the corresponding address pool identifier, and the corresponding identifier of the UPF network element. In addition, the OAM configures the corresponding session information. This is not specifically limited in this embodiment of this application.

Further, the address management method provided in this embodiment of this application may further include the following steps.

S1002 is the same as step S504 in the embodiment shown in FIG. 5. For a related description, refer to the embodiment shown in FIG. 5. Details are not described herein.

S1003 is similar to step S505 in the embodiment shown in FIG. 5. A difference lies in that, session information in this embodiment of this application includes at least one of a DNN, S-NSSAI, an IP address version, an identifier of a UPF network element, or an address pool selection policy.

S1004 and S1005 are the same as steps S506 and S507 in the embodiment shown in FIG. 5. For related descriptions, refer to the embodiment shown in FIG. 5. Details are not described herein.

S1006: The SMF network element determines, based on the session information in step S1003, the identifier of the UPF network element in step S1005, and the correspondence that is shown in Table 5 and is stored by the SMF network element in step S1001b or S1001c, an address pool identifier corresponding to the session, and a length of an IP address segment corresponding to an address pool.

For example, if the session information is the session information 2 in Table 5, and the identifier of the UPF network element is the UPF 1, it can be learned from Table 5 that the address pool identifier corresponding to the session is the identifier 2 and the length of the IP address segment corresponding to the address pool is the length 2.

Optionally, in this embodiment of this application, for each IP address segment in an address pool, the SMF network element maintains addresses in the IP address segment. For example, each IP address in the IP address segment corresponds to one assignment status. Each time the SMF network element assigns an IP address in the IP address segment, the SMF network element may set an assignment status of the IP address to assigned. Alternatively, when the SMF network element releases an IP address, the SMF network element may set an assignment status of the IP address to unassigned.

Optionally, in this embodiment of this application, after determining the address pool identifier, for the address pool identifier, the SMF network element may obtain a first IP address segment corresponding to the address pool identifier. Details are as follows.

The SMF network element determines whether an unassigned IP address corresponding to the address pool identifier exists. If the SMF network element determines that an unassigned IP address corresponding to the address pool identifier exists, the SMF network element may assign, to the session, an IP address from the unassigned IP address corresponding to the address pool identifier. Alternatively, if the SMF network element determines that an unassigned IP address corresponding to the address pool identifier does not exist, the SMF network element may obtain, from a server in a manner in steps S1007 to S1009, a start address of the IP address segment corresponding to the address pool identifier. This is not specifically limited in this embodiment of this application.

Optionally, in this embodiment of this application, that the SMF network element determines that an unassigned IP address corresponding to the address pool identifier does not exist may include: determining, by the SMF network element, that an unassigned IP address does not exist in an IP address segment determined based on the obtained start address or start addresses of the one or more IP address segments and the corresponding length of the IP address segment; or determining, by the SMF network element, that information about the IP address segment corresponding to the address pool identifier, for example, a start address of the IP address segment, has not been obtained from the server. This is not specifically limited in this embodiment of this application.

Optionally, in this embodiment of this application, that the SMF network element determines that an unassigned IP address corresponding to the address pool identifier exists may include determining, by the SMF network element, that an unassigned IP address exists, for example, an assignment status of an IP address is unassigned, in an IP address segment determined based on the obtained start address or start addresses of the one or more IP address segments and the length of the corresponding IP address segment.

Optionally, the address management method provided in this embodiment of this application further includes steps S1007 to S1009, to obtain, from the server, the start address of the IP address segment corresponding to the address pool identifier.

S1007: The SMF network element sends a second request message to the server, and the server receives the second request message from the SMF network element.

The second request message carries the address pool identifier determined in step S1006, and is used to request to assign a corresponding IP address to the session.

In this embodiment of this application, the server is preconfigured with the start address of the IP address segment corresponding to the address pool. For example, the server stores a correspondence between the address pool identifier and the start address or start addresses of the one or more corresponding IP address segments. This is not specifically limited in this embodiment of this application. Optionally, if the address pool identifier is unique within a scope of the UPF network element, the server may be further configured with a correspondence between the start address or start addresses of the one or more IP address segments, and the address pool identifier and the UPF network element. This is not specifically limited in this application. In other words, in this embodiment of this application, from a perspective of the server, the address pool corresponding to the UPF network element includes only a start address of each IP address segment, and the complete IP address segment is invisible to the server. In this case, assuming that the server is an existing DHCP server or AAA server, an existing DHCP protocol does not need to be modified. A general description is provided herein, and details are not described below.

Optionally, in this embodiment of this application, if the address pool identifier is unique within the scope of the UPF network element, the second request message further carries the identifier of the UPF network element. This is not specifically limited in this embodiment of this application.

Optionally, in this embodiment of this application, if the server is the DHCP server, for a related description of step S1007, refer to step S608 in the embodiment shown in FIG. 6. Details are not described herein.

Optionally, if the server in this embodiment of this application is an NRF network element, the NRF network element and the server in FIG. 10 are one network element. A general description is provided herein, and details are not described below.

S1008: The server determines a start address of the first IP address segment corresponding to the address pool identifier.

Optionally, in this embodiment, the server may determine, based on the address pool identifier and with reference to the start address or start addresses that is/are of the one or more IP address segments corresponding to the address pool and is/are configured on the server, the start address of the first IP address segment corresponding to the address pool identifier. For example, assuming that the IP21 address in FIG. 11 is unassigned, the server may determine that the start address of the first IP address segment corresponding to the address pool identifier is IP21.

Optionally, in this embodiment of this application, if the second request message further carries the identifier of the UPF network element, the server may determine, based on the address pool identifier and the identifier of the UPF network element and with reference to the start address or start addresses that is/are of the one or more IP address segments corresponding to the address pool and is/are configured on the server, the start address of the first IP address segment corresponding to the address pool identifier. This is not specifically limited in this embodiment of this application.

S1009: The server sends a second response message to the SMF network element, and the SMF network element receives the second response message from the server. The second response message carries the start address that is of the first IP address segment and is assigned by the server.

S1010: The SMF network element determines the first IP address segment based on the start address of the first IP address segment and the length that is determined in step S1006 and is of the IP address segment corresponding to the address pool.

For example, it is assumed that as shown in FIG. 11, the length of the IP address segment is n, and the start address of the first IP address segment is IP21. In this case, the SMF network element may determine that the first IP address segment includes n IP addresses: IP21 to IP2$n$.

S1011: The SMF network element assigns a first IP address in the first IP address segment to the session of the terminal.

For example, assuming that the first IP address segment determined by the SMF network element in step S1010 includes the n IP addresses, namely, IP21 to IP2$n$, the SMF network element may assign any unassigned IP address in the n IP addresses, namely, IP21 to IP2$n$ to the session of the terminal. This is not specifically limited in this embodiment of this application.

Optionally, the address management method provided in this embodiment of this application may further include step S1012.

S1012: The SMF network element determines that an IP address corresponding to a session needs to be released.

For example, in this embodiment of this application, when the SMF network element receives a PDU session release request sent by a terminal, if a type of the PDU session is an IP type, the SMF network element may determine that an IP address corresponding to the session needs to be released. This is not specifically limited in this embodiment of this application.

Optionally, in this embodiment of this application, assuming that the IP address that needs to be released is a second IP address, the SMF network element may set a status of the second IP address to unassigned, and find a corresponding IP address segment based on the second IP address. Then, the SMF network element may determine whether all addresses in the IP address segment corresponding to the second IP address are released, in other words, whether statuses of all the IP addresses in the IP address segment are set to unassigned. If the statuses of all the IP addresses in the IP address segment are set to unassigned, the address management method provided in this embodiment of this application further includes steps S1013 and S1014, to release the IP address segment corresponding to the second IP address.

S1013: The SMF network element sends a third request message to the server, and the server receives the third request message from the SMF network element. The third request message carries a start address of the to-be-released IP address segment.

For example, assuming that the to-be-released IP address in step S1012 is IP2x in FIG. 11, the start address of the corresponding IP address segment is IP21. Then, the third request message may carry IP21, to release the IP address segment in which IP21 is the start address.

Optionally, in this embodiment of this application, after receiving the third request message, the server releases IP21. For example, the server identifies a status of IP21 as unassigned.

S1014: The server sends a third response message to the SMF network element, and the SMF network element receives the third response message from the server.

In this way, after receiving the third response message, the SMF network element no longer uses the IP address segment. A general description is provided herein, and details are not described below.

According to the address management method provided in this embodiment of this application, a problem that a same IP address is assigned to different PDU sessions can be avoided, and IP addresses in an address pool can be effectively used. In addition, signaling exchange between the SMF network element and the server due to IP address assignment can be greatly reduced, and system resources can be saved. For an analysis of related technical effects, refer to the foregoing address management system part. Details are not described herein.

Actions of the SMF network element or the server in steps S1001 to S1014 may be performed by the processor 401 in the communications device 400 shown in FIG. 4 by invoking the application program code stored in the memory 403. This is not limited in this embodiment.

In conclusion, the embodiments of this application disclose an address management method, where the method includes: obtaining, by a session management network element, an identifier of a user plane function network element serving a terminal and session information of the terminal; determining, by the session management network element based on the identifier of the user plane function network element and the session information, an address pool identifier corresponding to a session; sending, by the session management network element, the address pool identifier to a server, where the address pool identifier is used to assign an IP address to the session; and receiving, by the session management network element from the server, the IP address corresponding to the session.

In an implementation, the address management method disclosed in the embodiment of this application may further include obtaining, by the session management network element, an address pool identifier corresponding to the identifier of the user plane function network element and the session information. Additionally, determining, by the session management network element based on the identifier of the user plane function network element serving the terminal and the session information, an address pool identifier corresponding to the session includes determining, by the session management network element, the address pool identifier corresponding to the identifier of the user plane function network element and the session information as the address pool identifier corresponding to the session.

In an implementation, the server includes a network repository function network element or a DHCP server, and sending, by the session management network element, the address pool identifier to a server includes sending, by the session management network element, a request message to the server, where the request message carries the address pool identifier. Additionally, receiving, by the session management network element from the server, the IP address corresponding to the session includes: receiving, by the session management network element, a response message from the server, where the response message carries the IP address corresponding to the session.

Further, in an implementation, the server includes the DHCP server, and when the address pool identifier is an IP address, the address pool identifier is carried in a GIADDR field of the request message. Alternatively, when the address pool identifier is not an IP address, the address pool identifier is carried in an extended DHCP relay agent information option of the request message.

In an implementation, the server includes the network repository function network element or the DHCP server, and the address management method disclosed in the embodiments of this application may further include: sending, by the session management network element to the server, an interface type of a tunnel corresponding to the session, where the interface type is used to allocate corresponding tunnel information to the session; and receiving, by the session management network element from the server, the tunnel information corresponding to the session.

In an implementation, the session information includes at least one of an address pool selection policy, a DNN, or an IP address version.

In an implementation, the address pool identifier includes at least one of a DNN, a start address of an address pool, an IP address version, or the identifier of the user plane function network element.

In the foregoing address management method, for example, for operations of the session management network element, refer to the operations of the SMF network element in FIG. 5 to FIG. 7 and the foregoing related text descriptions. Details are not described herein.

In addition, the embodiments of this application further discloses an address management method, where the method includes: obtaining, by a network repository function network element, an identifier of a user plane function network element serving a terminal and session information of the terminal; assigning, by the network repository function network element, an IP address to a session based on the identifier of the user plane function network element and the session information; and sending, by the network repository function network element to a session management network element, the IP address corresponding to the session.

In an implementation, assigning, by the network repository function network element, an IP address to a session based on the identifier of the user plane function network element and the session information includes: determining, by the network repository function network element based on the identifier of the user plane function network element and the session information, an address pool corresponding to the session; and assigning, by the network repository function network element to the session, the IP address in the address pool corresponding to the session.

In an implementation, the address management method disclosed in the embodiments of this application may further include: obtaining, by the network repository function network element, an address pool corresponding to the identifier of the user plane function network element and the session information. Additionally, determining, by the network repository function network element based on the identifier of the user plane function network element and the session information, an address pool corresponding to the session includes determining, by the network repository function network element, the address pool corresponding to the identifier of the user plane function network element and the session information as the address pool corresponding to the session.

In an implementation, obtaining, by a network repository function network element, session information of the terminal includes receiving, by the network repository function network element, the session information of the terminal from the session management network element.

In an implementation, obtaining, by a network repository function network element, an identifier of a user plane function network element serving a terminal includes: receiving, by the network repository function network element, the identifier of the user plane function network element from the session management network element; or determining, by the network repository function network element, the identifier of the user plane function network element.

In an implementation, the address management method disclosed in the embodiments of this application may further include: receiving, by the network repository function network element from the session management network element, an interface type of a tunnel corresponding to the session; allocating, by the network repository function network element, corresponding tunnel information to the session based on the identifier of the user plane function network element and the interface type; and sending, by the network repository function network element to the session management network element, the tunnel information corresponding to the session.

In an implementation, allocating, by the network repository function network element, corresponding tunnel information to the session based on the identifier of the user plane function network element and the interface type includes selecting, by the network repository function network element for the session from interface tunnel information of the user plane function network element corresponding to the identifier of the user plane function network element, a tunnel identifier and a tunnel IP address that correspond to the interface type.

In the foregoing address management method, for example, for operations of the network repository function network element, refer to the operations of the NRF network element in FIG. 5 to FIG. 7 and the foregoing related text descriptions. Details are not described herein.

The foregoing mainly describes the solutions provided in the embodiments of this application from a perspective of interaction between the network elements. It may be understood that, to implement the foregoing functions, the session management network element or the network repository function network element device includes corresponding hardware structures and/or software modules for performing the functions. A person skilled in the art should be aware that, in combination with the examples described in the embodiments disclosed in this specification, units and algorithms steps can be implemented by hardware or a combination of hardware and computer software in this application. Whether a function is performed by hardware or hardware driven by computer software depends on particular applications and design constraints of the technical solutions. The person skilled in the art may use different methods to implement the described functions for each particular application, but it should not be considered that the implementation goes beyond the scope of this application.

In the embodiments of this application, the session management network element or the network repository function network element may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, and is merely logical function division. In actual implementation, another division manner may be used.

Figure 8:
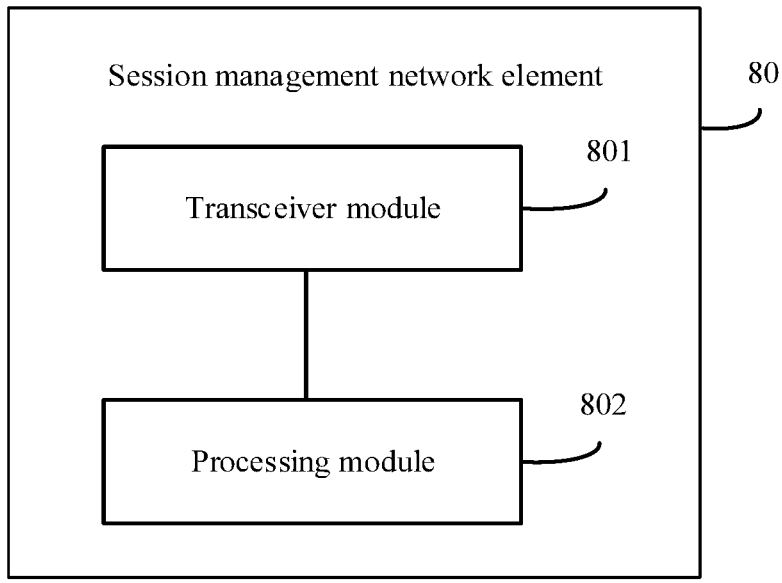
FIG. 8 is a schematic structural diagram of a session management network element according to an embodiment of this application.

For example, when functional modules are obtained through division in an integrated manner, FIG. 8 is a schematic structural diagram of a session management network element 80. The session management network element 80 includes a transceiver module 801 and a processing module 802.

Based on the session management network element 80 shown in FIG. 8, a possible implementation includes the following.

The processing module 802 is configured to obtain an identifier of a user plane function network element serving a terminal and session information of the terminal. The processing module 802 is further configured to determine, based on the identifier of the user plane function network element and the session information, an address pool identifier corresponding to a session. The transceiver module 801 is configured to send the address pool identifier to a server, where the address pool identifier is used to assign an IP address to the session. The transceiver module 801 is further configured to receive, from the server, the IP address corresponding to the session.

Further, the processing module 802 is further configured to obtain an address pool identifier corresponding to the identifier of the user plane function network element and the session information. That the processing module 802 is configured to determine, based on the identifier of the user plane function network element serving the terminal and the session information, an address pool identifier corresponding to the session includes determining the address pool identifier corresponding to the identifier of the user plane function network element and the session information as the address pool identifier corresponding to the session.

Optionally, the server includes a network repository function network element or a DHCP server. That the transceiver module 801 is configured to send the address pool identifier to a server includes sending a request message to the server, where the request message carries the address pool identifier. That the transceiver module 801 is configured to receive, from the server, the IP address corresponding to the session includes receiving a response message from the server, where the response message carries the IP address corresponding to the session.

Optionally, the server includes the network repository function network element or the DHCP server. The transceiver module 801 is further configured to send, to the server, an interface type of a tunnel corresponding to the session, where the interface type is used to allocate corresponding tunnel information to the session. The transceiver module 801 is further configured to receive, from the server, the tunnel information corresponding to the session.

All related content of the steps in the foregoing method embodiments may be cited in function descriptions of corresponding functional modules. Details are not described herein.

Based on the session management network element 80 shown in FIG. 8, in another possible implementation:

The processing module 802 is configured to: obtain an identifier of a user plane function network element serving a terminal and session information of the terminal; and determine, based on the identifier of the user plane function network element and the session information, an address pool identifier corresponding to the session. The transceiver module 801 is configured to: send the address pool identifier to the server; and receive, from the server, a start address of a first IP address segment corresponding to the address pool identifier. The processing module 802 is further configured to assign a first IP address to the session based on the start address of the first IP address segment.

Optionally, that the processing module 802 is configured to assign a first IP address to the session based on the start address of the first IP address segment includes: determining the first IP address segment based on the start address of the first IP address segment and a length of the first IP address segment; and assigning the first IP address in the first IP address segment to the session.

Optionally, the processing module 802 is further configured to determine that an unassigned IP address corresponding to the address pool identifier does not exist.

Optionally, that the processing module 802 is configured to determine that an unassigned IP address corresponding to the address pool identifier does not exist includes: determining that an IP address segment corresponding to the address pool identifier does not exist; or determining that a second IP address segment corresponding to the address pool identifier exists, but an unassigned IP address does not exist in the second IP address segment.

Optionally, the processing module 802 is further configured to obtain a length or lengths of one or more IP address segments corresponding to the address pool identifier, where the one or more IP address segments include the first IP address segment.

Optionally, that the processing module 802 is configured to obtain a length or lengths of one or more IP address segments corresponding to the address pool identifier includes obtaining, from a network repository function network element, the user plane network element, or an operation administration and maintenance network element, the length or lengths of the one or more IP address segments corresponding to the address pool identifier.

Optionally, the processing module 802 is further configured to determine that all IP addresses in the first IP address segment are released. The transceiver module 801 is further configured to send a first message to the server, where the first message includes the start address of the first IP address segment, and is used to release the start address of the first IP address segment.

In addition, optionally, in the foregoing two possible implementations, the processing module 802 is further configured to obtain a correspondence between the address pool identifier, and the identifier of the user plane function network element and the session information. Correspondingly, that the processing module 802 is configured to determine, based on the identifier of the user plane function network element and the session information, an address pool identifier corresponding to the session includes determining, based on the identifier of the user plane function network element, the session information, and the correspondence, the address pool identifier corresponding to the session.

Optionally, in the foregoing two possible implementations, that the processing module 802 is configured to obtain a correspondence between the address pool identifier, and the identifier of the user plane function network element and the session information includes obtaining, from the user plane network element, the operation administration and maintenance network element, or the network repository function network element, the correspondence between the address pool identifier, and the identifier of the user plane function network element and the session information.

In this embodiment, the session management network element 80 is presented in a form of functional modules obtained through division in an integrated manner. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the session management network element 80 may be in the form shown in FIG. 4.

For example, the processor 401 in FIG. 4 may invoke the computer-executable instruction stored in the memory 403, to enable the session management network element 80 to perform the address management method in the foregoing method embodiments.

For example, functions/implementation processes of the transceiver module 801 and the processing module 802 in FIG. 8 may be implemented by the processor 401 in FIG. 4 by invoking the computer-executable instruction stored in the memory 403. Alternatively, a function/an implementation process of the processing module 802 in FIG. 8 may be implemented by the processor 401 in FIG. 4 by invoking the computer-executable instruction stored in the memory 403, and a function/an implementation process of the transceiver module 801 in FIG. 8 may be implemented by the communications interface 403 in FIG. 4.

The session management network element provided in this embodiment may perform the foregoing address management method. Therefore, for a technical effect that can be achieved by the session management network element, refer to the foregoing method embodiments. Details are not described herein.

Optionally, an embodiment of this application further provides a chip system. The chip system includes a processor configured to support a session management network element in implementing the foregoing address management method, for example, obtaining an identifier of a user plane function network element serving a terminal and session information of the terminal. In a possible design, the chip system further includes a memory. The memory is configured to store a program instruction and data that are necessary for the session management network element. Certainly, alternatively, the memory may not be in the chip system. The chip system may include a chip, or may include a chip and another discrete device. This is not specifically limited in this embodiment of this application.

Figure 9:
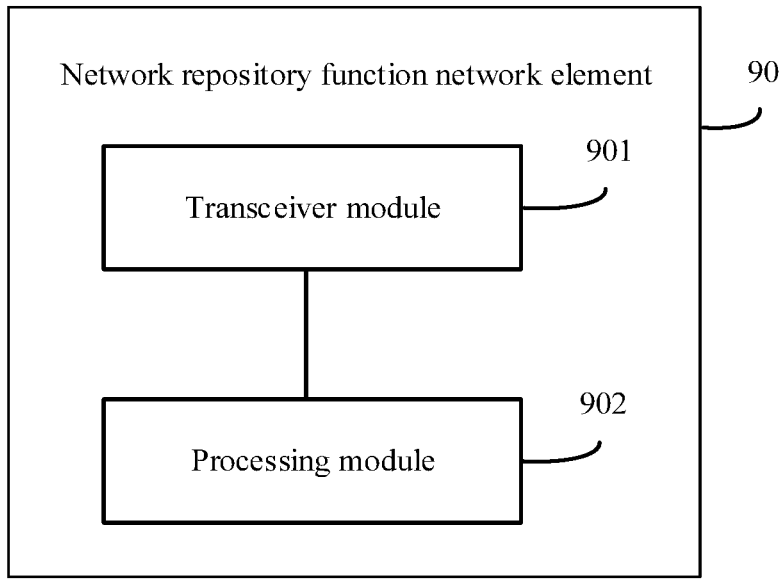
FIG. 9 is a schematic structural diagram of a network repository function network element according to an embodiment of this application.

For example, when functional modules are obtained through division in an integrated manner, FIG. 9 is a schematic structural diagram of a network repository function network element 90. The network repository function network element 90 includes a transceiver module 901 and a processing module 902.

The processing module 902 is configured to obtain an identifier of a user plane function network element serving a terminal and session information of the terminal. The processing module 902 is further configured to assign an IP address to a session based on the identifier of the user plane function network element and the session information. The transceiver module 901 is configured to send, to a session management network element, the IP address corresponding to the session.

In a possible implementation, that the processing module 902 is configured to assign an IP address to a session based on the identifier of the user plane function network element and the session information includes: determining, based on the identifier of the user plane function network element and the session information, an address pool corresponding to the session; and assigning, to the session, the IP address in the address pool corresponding to the session.

The processing module 902 is further configured to obtain an address pool corresponding to the identifier of the user plane function network element and the session information. That the processing module 902 is configured to determine, based on the identifier of the user plane function network element and the session information, an address pool corresponding to the session includes determining the address pool corresponding to the identifier of the user plane function network element and the session information as the address pool corresponding to the session.

Optionally, that the processing module 902 is configured to obtain session information of the terminal includes receiving the session information of the terminal from the session management network element.

Optionally, that the processing module 902 is configured to obtain an identifier of a user plane function network element serving a terminal includes: receiving the identifier of the user plane function network element from the session management network element; or determining the identifier of the user plane function network element.

Optionally, the transceiver module 901 is further configured to receive, from the session management network element, an interface type of a tunnel corresponding to the session. The processing module 902 is further configured to allocate corresponding tunnel information to the session based on the identifier of the user plane function network element and the interface type. The transceiver module 901 is further configured to send, to the session management network element, the tunnel information corresponding to the session.

In a possible implementation, that the processing module 902 is configured to allocate corresponding tunnel information to the session based on the identifier of the user plane function network element and the interface type includes selecting, for the session from interface tunnel information of the user plane function network element corresponding to the identifier of the user plane function network element, a tunnel identifier and a tunnel IP address that correspond to the interface type.

All related content of the steps in the foregoing method embodiments may be cited in function descriptions of corresponding functional modules. Details are not described herein.

In this embodiment, the network repository function network element 90 is presented in a form of functional modules obtained through division in an integrated manner. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the network repository function network element 90 may be in the form shown in FIG. 4.

For example, the processor 401 in FIG. 4 may invoke the computer-executable instruction stored in the memory 403, to enable the network repository function network element 90 to perform the address management method in the foregoing method embodiments.

For example, functions/implementation processes of the transceiver module 901 and the processing module 902 in FIG. 9 may be implemented by the processor 401 in FIG. 4 by invoking the computer-executable instruction stored in the memory 403. Alternatively, a function/an implementation process of the processing module 902 in FIG. 9 may be implemented by the processor 401 in FIG. 4 by invoking the computer-executable instruction stored in the memory 403, and a function/an implementation process of the transceiver module 901 in FIG. 9 may be implemented by the communications interface 403 in FIG. 4.

The network repository function network element provided in this embodiment may perform the foregoing address management method. Therefore, for a technical effect that can be achieved by the network repository function network element, refer to the foregoing method embodiments. Details are not described herein.

Optionally, an embodiment of this application further provides a chip system. The chip system includes a processor configured to support a network repository function network element in implementing the foregoing address management method, for example, assigning an IP address to a session based on an identifier of a user plane function network element and session information. In a possible design, the chip system further includes a memory. The memory is configured to store a program instruction and data that are necessary for the network repository function network element. Certainly, alternatively, the memory may not be in the chip system. The chip system may include a chip, or may include a chip and another discrete device. This is not specifically limited in this embodiment of this application.

All or some of the foregoing embodiments may be implemented by software, hardware, firmware, or any combination thereof. When a software program is used to implement the embodiments, the embodiments may be all or partially implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

Although this application is described with reference to features and the embodiments thereof, it is clear that various modifications and combinations may be made to them without departing from the spirit and scope of this application. Correspondingly, the specification and accompanying drawings are merely example descriptions of this application defined by the accompanying claims, and are intended to cover any or all of modifications, variations, combinations, or equivalents within the scope of this application. It is clear that, the person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An address management method, comprising:
   obtaining, by a session management network element, a correspondence between a second address pool identifier and both an identifier of a user plane function network element serving a terminal and session information of a session of the terminal, wherein the session information comprises at least one of a data network name (DNN) or an Internet Protocol (IP) address version;
   obtaining, by the session management network element, the identifier of the user plane function network element serving the terminal and the session information of the session, wherein obtaining the identifier of the user plane function network element comprises:
      sending, by the session management network element, a first request message to a network repository function network element, wherein the first request message comprises session requirement information of the session, and wherein the session requirement information is for selecting the user plane function network element; and
      receiving, by the session management network element, a first response message from the network repository function network element, wherein the first response message comprises the identifier of the user plane function network element;
   determining, by the session management network element based on the correspondence, the identifier, and the session information, the second address pool identifier as an address pool identifier corresponding to the session;
   sending, by the session management network element, a message including the address pool identifier to a server, wherein the message requests the server to assign an IP address to the session;
   receiving, by the server, the address pool identifier;
   assigning, by the server, the IP address to the session based on the address pool identifier;
   sending, by the server, the IP address to the session management network element; and
   receiving, by the session management network element, the IP address from the server.

2. The method according to claim 1, wherein obtaining the correspondence comprises obtaining, by the session management network element, the correspondence from the user plane function network element.

3. The method according to claim 1, wherein obtaining the correspondence comprises obtaining, by the session management network element, the correspondence from an operation administration and maintenance network element.

4. The method according to claim 1, wherein sending, by the server, the IP address to the session management network element comprises:
   sending, by the server, a response message directly to the session management network element, wherein the response message comprises the IP address corresponding to the session; and
   receiving, by the session management network element, the response message from the server.

5. The method according to claim 1, wherein the address pool identifier comprises at least one the DNN, the IP address version, the identifier, or a start address of an address pool.

6. The method according to claim 5, wherein IP addresses in the address pool are managed together by the server, and wherein the address pool identifier is carried in a gateway IP address (GIADDR) field of the message.

7. The method according to claim 1, wherein the session requirement information comprises the DNN and single network slice selection assistance information (S-NSSAI) corresponding to the session.

8. The method according to claim 1, wherein obtaining the session information of the session comprises obtaining, by the session management network element, the session information from a session establishment request message.

9. A session management network element, comprising:
   at least one processor; and
   a non-transitory computer computer-readable storage medium coupled to the at least one processor and configured to store instructions for execution by the at least one processor such that when executed, cause the session management network element to:
   obtain a correspondence between a second address pool identifier and both an
   identifier of a user plane function network element serving a terminal and session
   information of a session of the terminal, wherein the session information comprises at least one of a data network name (DNN) or an Internet Protocol (IP) address version;
obtain the identifier of the user plane function network element serving the terminal and the session information of the session, wherein the session management network element is configured to obtain the identifier of the user plane function network by:
sending a first request message to a network repository function network element, wherein the first request message comprises session requirement information of the session, and wherein the session requirement information is for selecting the user plane function network element; and
receiving a first response message from the network repository function network element, wherein the first response message comprises the identifier of the user plane function network element;
determine, based on the correspondence, the identifier, and the session information, the second address pool identifier as an address pool identifier corresponding to the session;
send the address pool identifier to a server, wherein the address pool identifier is for assigning an IP address to the session; and
receive, from the server, the IP address corresponding to the session.

10. The session management network element according to claim 9, wherein the at least one processor is configured to execute the instructions to cause the session management network element to obtain the correspondence from the user plane function network element.

11. The session management network element according to claim 9, wherein the at least one processor is further configured to execute the instructions to cause the session management network element to obtain the correspondence from an operation administration and maintenance network element.

12. The session management network element according to claim 9, wherein the at least one processor is configured to execute the instructions to cause the session management network element to:
determine that an unassigned IP address corresponding to the address pool identifier does not exist;
send a request message to the server, wherein the request message requests a start address of an IP address segment corresponding to the address pool identifier;
receive a response message from the server, wherein the response message comprises the start address of the IP address segment corresponding to the address pool identifier; and
assign a second IP address to the session based on the start address.

13. The session management network element according to claim 12, wherein the request message comprises a Dynamic Host Configuration Protocol (DHCP) message.

14. An address management system, comprising:
a session management network element configured to:
obtain a correspondence between a second address pool identifier and both an identifier of a user plane function network element serving a terminal and session information of a session of the terminal, wherein the session information comprises at least one of a data network name (DNN) or an Internet Protocol (IP) address version;
obtain the identifier of the user plane function network element serving the terminal and the session information of the session, wherein the session management network element is configured to obtain the identifier of the user plane function network by:
sending a first request message to a network repository function network element, wherein the first request message comprises session requirement information of the session, and wherein the session requirement information is for selecting the user plane function network element; and
receiving a first response message from the network repository function network element, wherein the first response message comprises the identifier of the user plane function network element;
determine, based on the correspondence, the identifier, and the session information, the second address pool identifier as an address pool identifier corresponding to the session; and
send the address pool identifier; and
a server configured to:
receive the address pool identifier from the session management network element;
assign an IP address to the session based on the address pool identifier; and
send, to the session management network element, the IP address corresponding to the session,
wherein the session management network element is further configured to receive, from the server, the IP address corresponding to the session.

15. The address management system according to claim 14, wherein the session management network element is further configured to obtain the correspondence from the user plane function network element.

16. The address management system according to claim 14, wherein the session management network element is configured to obtain the correspondence from an operation administration and maintenance network element.

17. The address management system according to claim 14, wherein the session management network element is configured to send a request message to the server, wherein the request message comprises the address pool identifier, wherein the server is configured to:
receive the request message;
select, as the IP address assigned to the session, an unused IP address from IP addresses in an address pool identified by the address pool identifier; and
send a response message to the session management network element,
wherein the response message comprises the IP address corresponding to the session, and wherein the session management network element is configured to receive the response message from the server.

18. The address management system according to claim 14, wherein the session information comprises the DNN.

19. The address management system according to claim 14, wherein the session information comprises the IP address version.

20. An address management method, comprising:
obtaining, by a session management network element, a correspondence between a second address pool identifier and both an identifier of a user plane function network element serving a terminal and session information of a session of the terminal, wherein the session information comprises at least one of a data network name (DNN) or an Internet Protocol (IP) address version;
obtaining, by the session management network element, the identifier of the user plane function network element serving the terminal and the session information of the session, wherein obtaining the identifier of the user plane function network element comprises:
- sending, by the session management network element, a first request message to a network repository function network element, wherein the first request message comprises session requirement information of the session, and wherein the session requirement information is for selecting the user plane function network element; and
- receiving, by the session management network element, a first response message from the network repository function network element, wherein the first response message comprises the identifier of the user plane function network element;
- determining, by the session management network element based on the identifier of the user plane function network element and the session information, an address pool identifier corresponding to the session;
- sending, by the session management network element, a message including the address pool identifier to a server, wherein the message requests the server to assign an IP address to the session; and
- receiving, by the session management network element, the IP address from the server.

21. The address management method according to claim 20, wherein obtaining, by the session management network element, the correspondence comprises obtaining, by the session management network element, the correspondence from the user plane function network element.

22. The address management method according to claim 20, wherein obtaining, by the session management network element, the correspondence comprises obtaining, by the session management network element, the correspondence from an operation administration and maintenance network element.

23. The address management method according to claim 20, wherein the address pool identifier comprises at least one of the DNN, the IP address version, the identifier, or a start address of an address pool.

* * * * *